(12) United States Patent
Chen et al.

(10) Patent No.: US 10,158,731 B2
(45) Date of Patent: *Dec. 18, 2018

(54) METHODS AND SYSTEMS FOR INCREASING ENGAGEMENT OF LOW ENGAGEMENT USERS IN A SOCIAL NETWORK

(71) Applicant: Facebook, Inc., Menlo Park, CA (US)

(72) Inventors: David Y. Chen, Mountain View, CA (US); Emily Grewal, Palo Alto, CA (US); Hisham Rabih Harik, Palo Alto, CA (US); Huan Yang, Sunnyvale, CA (US); Kiranjit Singh Sidhu, East Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/529,062

(22) Filed: Oct. 30, 2014

(65) Prior Publication Data

US 2015/0058423 A1 Feb. 26, 2015

Related U.S. Application Data

(63) Continuation of application No. 13/486,986, filed on Jun. 1, 2012, now Pat. No. 8,903,927.

(51) Int. Cl.
*H04L 29/08* (2006.01)
*H04L 12/58* (2006.01)
(Continued)

(52) U.S. Cl.
CPC ............. *H04L 67/22* (2013.01); *G06Q 50/01* (2013.01); *H04L 12/1813* (2013.01);
(Continued)

(58) Field of Classification Search
CPC .......... G06Q 30/0211; G06Q 30/0242; G06Q 50/01; G06Q 10/02; G06Q 10/10; G06Q 51/12; H04L 51/12; H04L 51/32; H04L 67/22; H04L 67/306; H04L 67/30; G06F 17/30867
See application file for complete search history.

(56) References Cited

U.S. PATENT DOCUMENTS 7,669,123 B2 * 2/2010 Zuckerberg ....... G06F 17/30867
715/273
8,521,661 B2 * 8/2013 Wang ................. G06F 17/3053
706/12

(Continued)

OTHER PUBLICATIONS

United States Office Action, U.S. Appl. No. 13/486,986, dated Apr. 11, 2014, eight pages.

*Primary Examiner* — Ramy M Osman
(74) *Attorney, Agent, or Firm* — Fenwick & West LLP

(57) ABSTRACT

Techniques to increase engagement with a social networking system. In one embodiment, an engagement level of a user with a social networking system is monitored. A low engagement user type associated with the user is identified from a plurality of low engagement user types. It is determined whether the engagement level of the user is less than a threshold. If so, a communication is provided for the user based on the low engagement user type associated with the user. The communication may be a notification or a digest communication.

17 Claims, 14 Drawing Sheets

(51) Int. Cl.
    *G06Q 50/00* (2012.01)
    *H04L 12/18* (2006.01)

(52) U.S. Cl.
    CPC .............. *H04L 51/06* (2013.01); *H04L 51/12* (2013.01); *H04L 51/32* (2013.01); *H04L 67/26* (2013.01); *H04L 67/30* (2013.01)

(56) References Cited

U.S. PATENT DOCUMENTS

| | | | |
|---|---|---|---|
| 8,560,962 B2* | 10/2013 | Wang | G06Q 50/01 715/751 |
| 8,700,640 B2* | 4/2014 | Shivashankar | G06F 17/30283 705/14.69 |
| 8,738,705 B2* | 5/2014 | Kelmenson et al. | 709/205 |
| 8,812,592 B2* | 8/2014 | Deng | G06Q 30/02 705/319 |
| 8,856,248 B2* | 10/2014 | Chen | H04L 51/32 709/204 |
| 8,903,927 B2* | 12/2014 | Chen et al. | 709/206 |
| 8,959,086 B2* | 2/2015 | Bastide | G06Q 50/01 707/728 |
| 9,026,592 B1* | 5/2015 | Marra | H04L 67/22 709/204 |
| 9,088,620 B2* | 7/2015 | Balakrishnan | H04L 67/22 |
| 9,147,008 B2* | 9/2015 | Griffin | G06F 17/30867 |
| 9,208,187 B2* | 12/2015 | Dunn | G06F 17/30345 |
| 9,313,082 B1* | 4/2016 | Marra | G06Q 50/01 |
| 9,754,051 B2* | 9/2017 | Bastide | H04L 67/22 |
| 2008/0040474 A1* | 2/2008 | Zuckerberg | H04L 67/306 709/224 |
| 2008/0098125 A1* | 4/2008 | Wang Baldonado | G06Q 10/107 709/231 |
| 2008/0134053 A1* | 6/2008 | Fischer | G06Q 10/02 715/747 |
| 2008/0168099 A1 | 7/2008 | Skaf | |
| 2009/0217178 A1* | 8/2009 | Niyogi | G06F 17/30876 715/753 |
| 2009/0265137 A1* | 10/2009 | Iida | G06F 11/2294 702/183 |
| 2009/0327054 A1 | 12/2009 | Yao et al. | |
| 2010/0064040 A1* | 3/2010 | Wise | G06Q 30/02 709/224 |
| 2010/0121707 A1* | 5/2010 | Goeldi | G06Q 50/01 705/14.49 |
| 2011/0113096 A1* | 5/2011 | Long et al. | 709/204 |
| 2011/0246907 A1* | 10/2011 | Wang et al. | 715/751 |
| 2011/0258039 A1* | 10/2011 | Patwa et al. | 705/14.45 |
| 2012/0005224 A1* | 1/2012 | Ahrens | H04L 67/306 707/769 |
| 2012/0015639 A1 | 1/2012 | Trivi et al. | |
| 2012/0041907 A1* | 2/2012 | Wang et al. | 706/12 |
| 2012/0066196 A1* | 3/2012 | Dempski | G06F 17/30864 707/706 |
| 2012/0079023 A1* | 3/2012 | Tejada-Gamero | G06Q 50/01 709/204 |
| 2012/0136866 A1* | 5/2012 | Carter | G06Q 50/01 707/740 |
| 2012/0215597 A1* | 8/2012 | Ross | 705/14.1 |
| 2012/0283855 A1 | 11/2012 | Hoffman et al. | |
| 2012/0331053 A1* | 12/2012 | Dunn | G06Q 50/01 709/204 |
| 2013/0031172 A1* | 1/2013 | Olsen | H04L 51/32 709/204 |
| 2013/0159507 A1* | 6/2013 | Mason et al. | 709/224 |
| 2013/0179255 A1 | 7/2013 | Joa et al. | |
| 2013/0268591 A1* | 10/2013 | Chen et al. | 709/204 |
| 2013/0325394 A1 | 12/2013 | Yuen et al. | |
| 2013/0325755 A1* | 12/2013 | Arquette et al. | 706/12 |

* cited by examiner

⎯ 610

Hi Jay,

We're trying out a new feature to reduce the amount of email you receive from us. Starting today, we are turning off most individual email notifications and instead, we'll send you a summary only if there are popular stories you may have missed You can turn individual emails back on and restore all your old settings at any time.

⎯ 612

Thanks,
The social networking website team

The message was sent to jdumphy@xyzmail.com. If you don't want to receive these emails from our social networking website in the future or have your email address used for friend suggestions, you can unsubscribe from us at SNW, Inc., 123 Elm Street, Eulidia, AK 01234.

Are you sure you want to turn on individual email notifications?

Your individual email notifications have been turned off and you are now subscribed to digest emails that highlight your friends' most popular activity. It's a great way to keep up with your friends without getting lots of separate emails from Facebook.

Do you want to turn on individual email notifications?

Manage Notification Settings          [ Confirm ]   [ Cancel ]

METHODS AND SYSTEMS FOR INCREASING ENGAGEMENT OF LOW ENGAGEMENT USERS IN A SOCIAL NETWORK

CROSS REFERENCE TO RELATED APPLICATIONS

This application is a continuation of co-pending U.S. application Ser. No. 13/486,986, filed Jun. 1, 2012, which is incorporated by reference in its entirety.

FIELD OF THE INVENTION

The present application relates to social networking and, in particular, systems and methods for increasing engagement of low engagement users in a social network.

BACKGROUND

Social networking websites provide a dynamic environment in which members can connect to and communicate with other members. These websites commonly may provide online mechanisms allowing members to interact within their preexisting social networks as well as create new social networks. Members may include any individual or other entity, such as an organization or business. Among other attributes, social networking websites allow members to effectively and efficiently communicate relevant information to their social networks.

A member of a social network may highlight or share personal information, news stories, relationship activities, music, and any other content of interest to areas of the website dedicated to the member. Other members of the social network may access the shared content by browsing member profiles or performing dedicated searches. Upon access to and consideration of the content, the other members may react by taking one or more responsive actions, such as providing an opinion about the content, or other feedback. The ability of members to interact in this manner fosters communications among them and helps to realize the goals of social networking websites.

Low engagement with the social networking website poses myriad disadvantages. For example, if the user posts infrequently, or posts unpopular or uninteresting content to the social networking website, that user may elicit little or no feedback from other members. In another example, if the user is a new user, or has not connected to many other users within the social networking website, the user's postings may only be available to a few members, and may not elicit any or significant feedback. If the user has little interaction on the social networking website, she may not experience the full potential of the social networking website and may be less likely to visit and frequent the website in the future.

SUMMARY

To increase user engagement with a social networking system, embodiments of the invention provide communications to be sent to a user regarding activities in the social network of the user. In an embodiment of the invention, an engagement level of a user with a social networking system is monitored. A low engagement user type associated with the user is identified from a plurality of low engagement user types. It is determined whether the engagement level of the user is less than a threshold. If so, a communication is provided for the user based on the low engagement user type associated with the user. The communication may be a notification or a digest communication. Information for inclusion within the communication may be selected based upon the low engagement user type.

In an embodiment of the invention, the threshold may correspond to types of low engagement user types. The threshold may be based on various predetermined values including, but not limited to, time between logins of the user, time between visits of the user to the social networking system, an amount of content shared by the user over a period of time, an amount of feedback received by the user in response to content shared by the user over time, a number of friends of the user, a time after the account of the user is created, or any combination thereof.

In an embodiment of the invention, the communication can include various types of information to be sent to the user. The information can include, but is not limited to, a notification about the occurrence of an event, an indication that another user likes content shared by the user, an indication that another user likes content in which the user has been tagged, an identification of other users determined to be potential friends of the user, or any other activity directly or indirectly related to the social networking system.

In an embodiment of the invention, the engagement level of the user may be continuously monitored to determine whether the engagement level is less than the threshold. Communications may be provided for the user so long as the engagement level is less than the threshold.

Many other features and embodiments of the invention will be apparent from the accompanying drawings and from the following detailed description

BRIEF DESCRIPTION OF THE DRAWINGS

FIGS. 6A-6B show messages provided by the social networking system regarding user management of notifications in accordance with embodiments of the invention.

Figure 1:
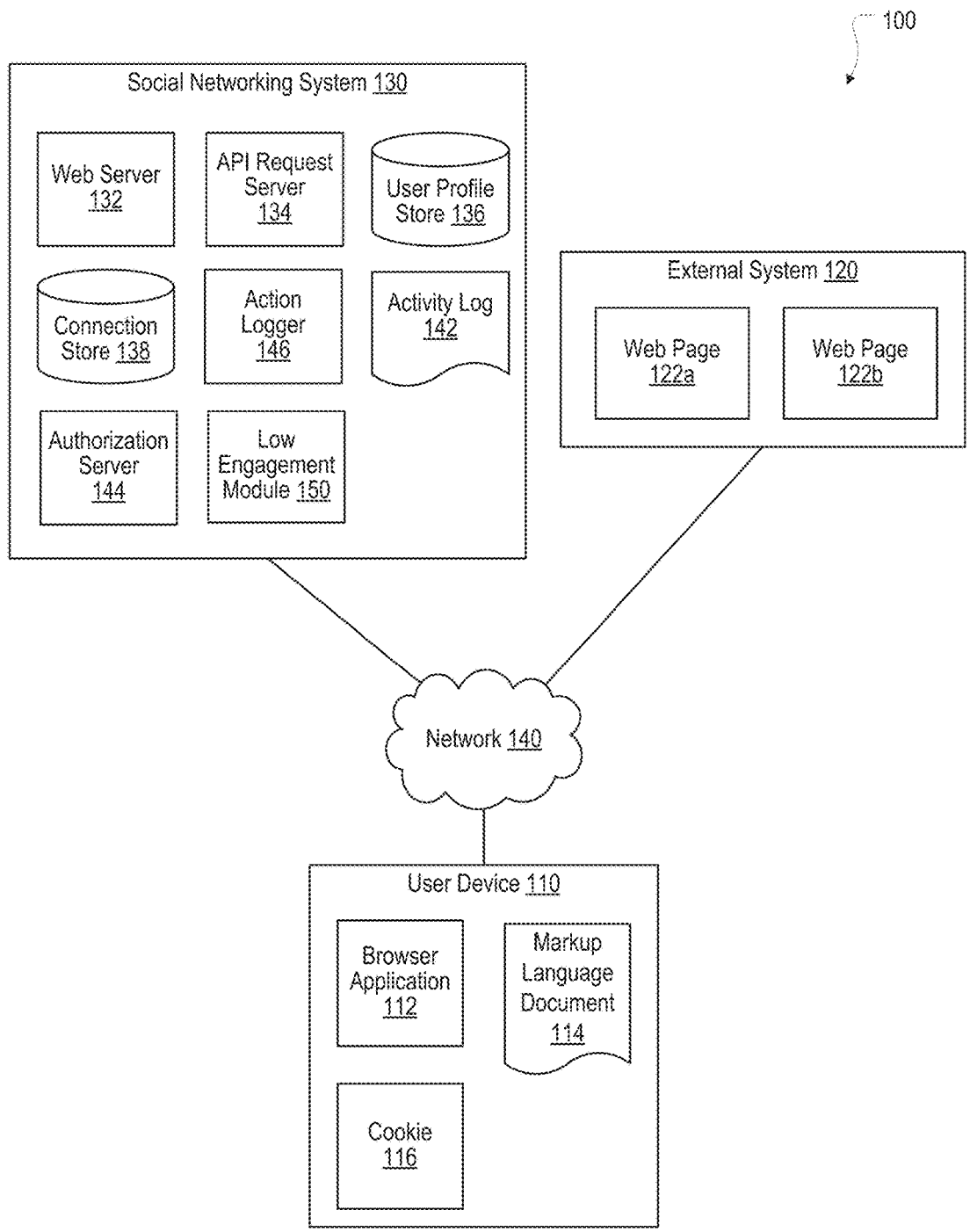
FIG. 1 is a network diagram of a system for increasing engagement with a social networking system in accordance with an embodiment of the invention.

The figures depict various embodiments of the present invention for purposes of illustration only, wherein the figures use like reference numerals to identify like elements. One skilled in the art will readily recognize from the following discussion that alternative embodiments of the structures and methods illustrated in the figures may be employed without departing from the principles of the invention described herein.

DETAILED DESCRIPTION

Social Networking System—General Introduction

FIG. 1 is a network diagram of a system 100 for increasing engagement of users with a social networking system 130 in accordance with an embodiment of the invention. The system 100 includes one or more user devices 110, one or more external systems 120, the social networking system 130, and a network 140. For purposes of illustration, the embodiment of the system 100 shown by FIG. 1 includes a single external system 120 and a single user device 110. However, in other embodiments, the system 100 may include more user devices 110 and/or more external systems 120. In certain embodiments, the social networking system 130 is operated by a social network provider, whereas the external systems 120 are separate from the social networking system 130 in that they may be operated by different entities. In various embodiments, however, the social networking system 130 and the external systems 120 operate in conjunction to provide social networking services to users (or members) of the social networking system 130. In this sense, the social networking system 130 provides a platform, or backbone, which other systems, such as external systems 120, may use to provide social networking services and functionalities to users across the Internet.

The user device 110 comprises one or more computing devices that can receive input from a user and can transmit and receive data via the network 140. In one embodiment, the user device 110 is a conventional computer system executing, for example, a Microsoft Windows compatible operating system (OS), Apple OS X, and/or a Linux distribution. In another embodiment, the user device 110 can be a device having computer functionality, such as a smartphone, a tablet, a personal digital assistant (PDA), a mobile telephone, etc. The user device 110 is configured to communicate via the network 140. The user device 110 can execute an application, for example, a browser application that allows a user of the user device 110 to interact with the social networking system 130. In another embodiment, the user device 110 may interact with the social networking system 130 through an application programming interface (API) provided by the native operating system of the user device 110, such as iOS and ANDROID. The user device 110 is configured to communicate with the external system 120 and the social networking system 130 via the network 140, which may comprise any combination of local area and/or wide area networks, using wired and/or wireless communication systems.

In one embodiment, the network 140 uses standard communications technologies and/or protocols. Thus, the network 140 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 140 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 140 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 110 may display content from the external system 120 and/or from the social networking system 130 by processing a markup language document 114 received from the external system 120 and from the social networking system 130 using a browser application 112. The markup language document 114 identifies content and one or more instructions describing formatting or presentation of the content. By executing the instructions included in the markup language document 114, the browser application 112 displays the identified content using the format or presentation described by the markup language document 114. For example, the markup language document 114 includes instructions for generating and displaying a web page having multiple frames that include text and/or image data retrieved from the external system 120 and the social networking system 130. In various embodiments, the markup language document 114 comprises a data file including extensible markup language (XML) data, extensible hypertext markup language (XHTML) data, or other markup language data. Additionally, a markup language document 114 may include JavaScript Object Notation (JSON) data, JSON with padding (JSONP), and JavaScript data to facilitate data-interchange between the external system 120 and the user device 110. The browser application 112 on the user device 110 may use a JavaScript compiler to decode the markup language document 114.

The markup language document 114 may also include, or link to, applications or application frameworks such as FLASH™ or Unity™ applications, the SilverLight™ application framework, etc.

In one embodiment, the user device 110 also includes one or more cookies 116 including data indicating whether a user of the user device 110 is logged into the social networking system 130, which may enable customization of the data communicated from the social networking system 130 to the user device 110.

The external system 120 includes one or more web servers including one or more web pages 122a, 122b, which are communicated to the user device 110 using the network 140. The external system 120 is separate from the social networking system 130. For example, the external system 120 is associated with a first domain while the social networking system 130 is associated with a separate social networking domain. Web pages 122a, 122b included in the external system 120 comprise markup language documents identifying content and including instructions specifying formatting or presentation of the identified content.

The social networking system 130 includes one or more computing devices for a social network, including a plurality of users and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure.

Users may join the social networking system 130 and then add connections to any number of other users of the social networking system 130 to whom they desire to be connected. As used herein, the term "friend" refers to any other user of the social networking system 130 to whom a user has formed a connection, association, or relationship via the social networking system 130. In an embodiment, if users in the social networking system 130 are represented as nodes in the social graph, the term "friend" can refer to an edge formed between and directly connecting two user nodes, for example.

Connections may be added explicitly by a user or may be automatically created by the social networking system 130 based on common characteristics of the users (e.g., users who are alumni of the same educational institution). For example, a first user specifically selects a particular other user to be a friend. Connections in the social networking system 130 are usually in both directions, but need not be, so the terms "user" and "friend" depend on the frame of reference. Connections between users of the social networking system 130 are usually bilateral ("two-way"), or "mutual," but connections may also be unilateral, or "one-way." For example, if Bob and Joe are both users of the social networking system 130 and connected to each other, Bob and Joe are each other's connections. If, on the other hand, Bob wishes to connect to Joe to view data communicated to the social networking system 130 by Joe, but Joe does not wish to form a mutual connection, a unilateral connection may be established. The connection between users may be a direct connection; however, some embodiments of a social networking system 130 allow the connection to be indirect via one or more levels of connections or degrees of separation.

In addition to establishing and maintaining connections between users and allowing interactions between users, the social networking system 130 provides users with the ability to take actions on various types of items supported by the social networking system 130. These items may include groups or networks (i.e., social networks of people, entities, and concepts) to which users of the social networking system 130 may belong, events or calendar entries in which a user might be interested, computer-based applications that a user may use via the social networking system 130, transactions that allow users to buy or sell items via the service, and interactions with advertisements that a user may perform on or off the social networking system 130. These are just a few examples of the items upon which a user may act on a social networking system 130, and many others are possible. A user may interact with anything that is capable of being represented in the social networking system 130 or in the external system 120, separate from the social networking system 130, coupled to the social networking system 130 via the network 140.

The social networking system 130 is also capable of linking a variety of entities. For example, the social networking system 130 enables users to interact with each other as well as external systems 120 or other entities through an API, a web service, or other communication channels. The social networking system 130 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 130. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 130 modifies edges connecting the various nodes to reflect the relationships and interactions.

The social networking system 130 also includes user-generated content, which enhances a user's interactions with the social networking system 130. User-generated content may include anything a user can add, upload, send, or "post" to the social networking system 130. For example, a user communicates posts to the social networking system 130 from a user device 110. Posts may include data such as status updates or other textual data, location information, images such as photos, videos, links, music or other similar data and/or media. Content may also be added to the social networking system 130 by a third-party. Content "items" are represented as objects in the social networking system 130. In this way, users of the social networking system 130 are encouraged to communicate with each other by posting text and content items of various types of media through various communication channels. Such communication increases the interaction of users with each other and increases the frequency with which users interact with the social networking system 130.

The social networking system 130 includes a web server 132, an API request server 134, a user profile store 136, a connection store 138, an action logger 146, an activity log 142, an authorization server 144, and a low engagement module 150. In an embodiment of the invention, the social networking system 130 may include additional, fewer, or different components for various applications. Other components, such as network interfaces, security mechanisms, load balancers, failover servers, management and network operations consoles, and the like are not shown so as to not obscure the details of the system.

The user profile store 136 maintains user profiles, including biographic, demographic, and other types of descriptive information, such as work experience, educational history, hobbies or preferences, location, and the like that has been declared by users or inferred by the social networking system 130. This information is stored in the user profile store 136 such that each user is uniquely identified. The social networking system 130 also stores data describing one or more connections between different users in the connection store 138. The connection information may indicate users who have similar or common work experience, group memberships, hobbies, or educational history. Additionally, the social networking system 130 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 130, such as non-person entities, buckets, cluster centers, images, interests, pages, external systems, concepts, and the like are also stored in the connection store 138.

The social networking system 130 maintains data about objects with which a user may interact. To maintain this data, the user profile store 136 and the connection store 138 store instances of the corresponding type of objects maintained by the social networking system 130. Each object type has information fields that are suitable for storing information appropriate to the type of object. For example, the user profile store 136 contains data structures with fields suitable for describing a user's profile. When a new object of a particular type is created, the social networking system 130 initializes a new data structure of the corresponding type, assigns a unique object identifier to it, and begins to add data to the object as needed. This might occur, for example, when a user becomes a user of the social networking system 130, and the social networking system 130 generates a new instance of a user profile in the user profile store 136, assigns a unique identifier to the user profile, and begins to populate the fields of the user profile with information provided by the user.

The connection store 138 includes data structures suitable for describing a user's connections to other users, connections to external systems 120 or connections to other entities. The connection store 138 may also associate a connection type with a user's connections, which may be used in conjunction with the user's privacy setting to regulate access to information about the user. In an embodiment of the invention, the user profile store 136 and the connection store 138 may be implemented as a federated database.

Data stored in the connection store 138, the user profile store 136 and the activity log 142 enables the social networking system 130 to generate the social graph that uses nodes to identify various objects and edges connecting nodes to identify relationships between different objects. For example, if a first user establishes a connection with a second user in the social networking system 130, user profiles of the first user and the second user from the user profile store 136 may act as nodes in the social graph. The connection between the first user and the second user stored by the connection store 138 is an edge between the nodes associated with the first user and the second user. Continuing this example, the second user may then send the first user a message within the social networking system 130. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 130 (or, alternatively, in an image maintained by another system outside of the social networking system 130). The image may itself be represented as a node in the social networking system 130. This tagging action may create edges between the first user and the second user as well as create an edge between each of the users and the image, which is also a node in the social graph. In yet another example, if a user confirms attending an event, the user and the event are nodes obtained from the user profile store 136, where the attendance of the event is an edge between the nodes that may be retrieved from the activity log 142. By generating and maintaining the social graph, the social networking system 130 includes data describing many different types of objects and the interactions and connections among those objects, providing a rich source of socially relevant information.

The web server 132 links the social networking system 130 to one or more user devices 110 and/or one or more external systems 120 via the network 140. The web server 132 serves web pages, as well as other web-related content, such as Java, JavaScript, Flash, XML, and so forth. The web server 132 may include a mail server or other messaging functionality for receiving and routing messages between the social networking system 130 and one or more user devices 110. The messages can be instant messages, queued messages (e.g., email), text and SMS messages, or any other suitable messaging format.

The API request server 134 allows one or more external systems 120 and user devices 110 to call access information from the social networking system 130 by calling one or more API functions. The API request server 134 may also allow external systems 120 to send information to the social networking system 130 by calling APIs. The external system 120, in one embodiment, sends an API request to the social networking system 130 via the network 140, and the API request server 134 receives the API request. The API request server 134 processes the request by calling an API associated with the API request to generate an appropriate response, which the API request server 134 communicates to the external system 120 via the network 140. For example, responsive to an API request, the API request server 134 collects data associated with a user, such as the user's connections that have logged into the external system 120, and communicates the collected data to the external system 120. In another embodiment, the user device 110 communicates with the social networking system 130 via APIs in the same manner as external systems 120.

The action logger 146 is capable of receiving communications from the web server 132 about user actions on and/or off the social networking system 130. The action logger 146 populates the activity log 142 with information about user actions, enabling the social networking system 130 to discover various actions taken by its users within the social networking system 130 and outside of the social networking system 130. Any action that a particular user takes with respect to another node on the social networking system 130 may be associated with each user's profile, through information maintained in the activity log 142 or in a similar database or other data repository. Examples of actions taken by a user within the social networking system 130 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 130, the action is recorded in the activity log 142. In one embodiment, the social networking system 130 maintains the activity log 142 as a database of entries. When an action is taken within the social networking system 130, an entry for the action is added to the activity log 142. The activity log 142 may be referred to as an action log.

Additionally, user actions may be associated with concepts and actions that occur within an entity outside of the social networking system 130, such as an external system 120 that is separate from the social networking system 130. For example, the action logger 146 may receive data describing a user's interaction with an external system 120 from the web server 132. In this example, the external system 120 reports a user's interaction according to structured actions and objects in the social graph.

Other examples of actions where a user interacts with an external system 120 include a user expressing an interest in an external system 120 or another entity, a user posting a comment to the social networking system 130 that discusses an external system 120 or a web page 122a within the external system 120, a user posting to the social networking system 130 a Uniform Resource Locator (URL) or other identifier associated with an external system 120, a user attending an event associated with an external system 120, or any other action by a user that is related to an external system 120. Thus, the activity log 142 may include actions describing interactions between a user of the social networking system 130 and an external system 120 that is separate from the social networking system 130.

The authorization server 144 enforces one or more privacy settings of the users of the social networking system 130. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 120, or any entity that can potentially access the information. The information that can be shared by a user comprises user profile information like profile photo, phone numbers associated with the user, user's connections, actions taken by the user such as adding a connection, changing user profile information, and the like.

The privacy setting specification may be provided at different levels of granularity. For example, the privacy setting may identify specific information to be shared with other users. For example, the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 120. One embodiment allows the specification of the set of entities to comprise an enumeration of entities. For example, the user may provide a list of external systems 120 that are allowed to access certain information. Another embodiment allows the specification to comprise a set of entities along with exceptions that are not allowed to access the information. For example, a user may allow all external systems 120 to access the user's work information but specify a list of external systems 120 that are not allowed to access the work information. Certain embodiments call the list of exceptions that are not allowed to access certain information a "block list". External systems 120 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 144 contains logic to determine if certain information associated with a user can be accessed by a user's friends, external systems 120 and/or other applications and entities. The external system 120 may need authorization from the authorization server 144 to access the user's more private and sensitive information, such as the user's work phone number. Based on the user's privacy settings, the authorization server 144 determines if another user, the external system 120, an application, or another entity is allowed to access information associated with the user, including information about actions taken by the user.

The social networking system 130 may also include the low engagement module 150 to identify low engagement users and increase the level of engagement of the low engagement users with the social networking system 130. The level of interaction between various users and the social networking system 130 may vary. For example, while some users may often engage with the social networking system 130, other users may less frequently so engage. While some users have befriended many other users, other users have only a few friends. And, while some users frequently post content that is viewed as interesting or engaging, other users post infrequently, or post poor quality content that does not receive feedback or comments from other users.

Users may have limited engagement with the social networking system 130 for a variety of reasons. For example, they may choose to spend much of their social time in offline activities. As another example, even when online, they may choose to frequent other websites. Low levels of engagement impede communications among members of a social network and detract from the overall user experience of the social networking system 130. In some cases, a low engagement user may lose interest in the social network if the user has not connected to many other users, or if the content posted by the user does not receive feedback. If the user loses interest in the social network, the user may become less active or inactive, or may even deregister from the social network. In contrast, a high level of engagement for all users fosters communication among users, and helps to realize the potential of the social networking system 130.

Once it has been determined that a user is a low engagement user, the low engagement module 150 can selectively provide tailored communications to the low engagement user to increase the user's engagement with the social networking system 130. The low engagement module 150 may control the content and frequency of communications provided to users regarding activities that have transpired in their social networks or suggestions about how to participate in their social network. Such communication encourages low engagement users having a low level of engagement with the social networking system 130 to increase their engagement with the social networking system 130, as discussed in more detail below.

Engagement Optimization

Figure 2:
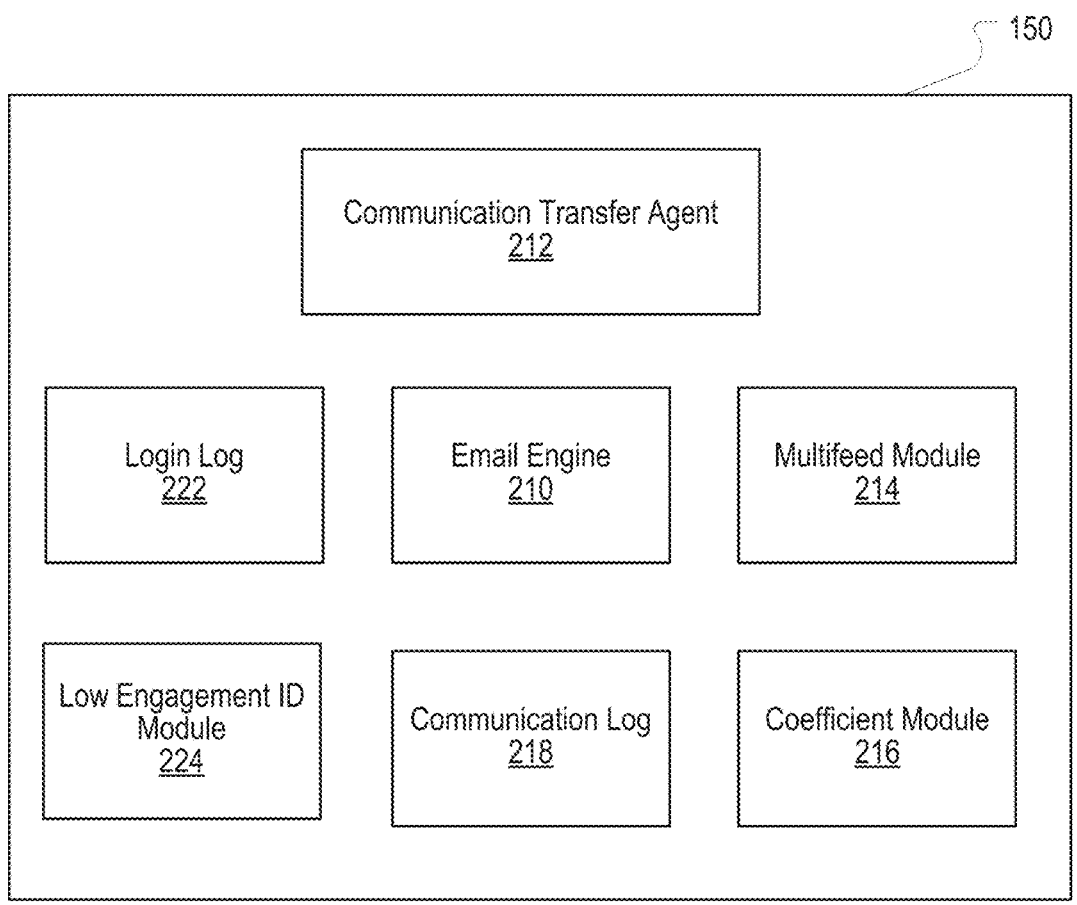
FIG. 2 is a block diagram of a low engagement module of the social networking system in accordance with an embodiment of the invention.

FIG. 2 is a diagram of the low engagement module 150 of FIG. 1 in accordance with an embodiment of the invention. The low engagement module 150 may measure and monitor the level of activity of a user of the social networking system 130 and, at one or more specified frequencies, provide communications to the user about her social network.

The low engagement module 150 may also categorize low engagement users into different categories of low engagement so that the social networking system 130 can provide appropriate communications to the low engagement users. In an embodiment, the low engagement module 150 can tailor the content and frequency of the communications based on the type of low engagement category. For example, if the low engagement user is a new user, the low engagement module 150 can send an email that identifies the user's friends, or can suggest users that the new user may wish to befriend. As will be discussed below, different types of communications can be sent to users depending upon their type of low engagement in order to maximize the effectiveness of the communication in encouraging increased activity on the social networking system 130.

The low engagement module 150 includes an email engine 210, a communication transfer agent (CTA) 212, a multifeed module 214, a coefficient module 216, a communication log 218, a login log 222, and a low engagement identification (ID) module 224. In an embodiment of the invention, the functions performed by the components (e.g., logs, engines, modules, etc.) shown in FIGS. 1 and 2 may be variously replaced by, combined with, or integrated into other components. In an embodiment of the invention, the social networking system 130 may include additional, fewer, or different components for various applications. Other components such as network interfaces, security mechanisms, load balancers, failover servers, management and network operations consoles, and the like are not shown so as to not obscure the details of the system.

The email engine 210 controls the provision of communications through the communication transfer agent (CTA) 212 to a user of the social networking system 130 based on information exchanged with the multifeed module 214, the coefficient module 216, the communication log 218, the login log 222, and the low engagement identification (ID) module 224. The communication transfer agent (CTA) 212 may provide electronic communications, e.g., messages, to a user who receives such messages through, for example, email, SMS, or a message system external to the social networking system 130, such as the external system 120.

In an embodiment, the low engagement ID module 224 may identify users and target those users whose engagement with the social networking system 130 is low. The users may be identified and categorized into different types of low engagement users. Low engagement ID module 224 may compare the activity (or attributes related to activity) of a user on the social networking system 130 to one or more activity thresholds corresponding to different types of low engagement. It may be determined that, if a user falls below a particular threshold, then the engagement level of the user may not be optimal. In an embodiment, the thresholds may be predetermined or selected values that may represent minimum acceptable levels of activity for users that engage with the social networking system 130.

In one embodiment, the low engagement ID module 224 may identify users who have posted little content to the social networking system 130 as low feedback users, one type of low engagement users. Content can include, but is not limited to status updates, photos, videos, articles, links, announcements, events, "likes", comments, and the like. The low engagement ID module 224 can monitor the amount of content or the number of content items posted by a user, or the frequency of content postings by the user. If, for example, the frequency of the content postings falls below the threshold of a predetermined frequency, low engagement ID module 224 can categorize the user as a low engagement user. The predetermined content-posting frequency can be, for example, one post per day, two posts per week, eight posts per month, or any desired frequency.

Additionally or alternatively, the low engagement ID module 224 can identify the user as a low feedback user if the user receives little feedback on the content she posts or posts little content (or shares), or both. Feedback can be responses, provided by other users, to content posted by the user. For example, other users can provide feedback by "liking" or commenting on content posted by the user. Feedback can also include responses, provided by other users, to content associated with the user. As an example, other users can provide feedback to the user if they "like" or comment on content in which the user is identified or "tagged." In general, other users can provide feedback by responding, within the social networking system 130, to content associated with the user, or content posted by the user. If the feedback received by the user falls below the threshold of a predetermined frequency, low engagement ID module 224 can categorize the user as a low engagement user. The predetermined feedback frequency can be, for example, 1 feedback entry per day, 2 feedback entries per week, 2 feedback entries every two weeks, 8 feedback entries per month, or any desired frequency. In an embodiment, the low engagement ID module 224 may also identify the user as a low feedback user if the amount of content posts (or shares) of the user in a first time period falls below a threshold. In an embodiment, the low engagement ID module 224 may identify a user as a low feedback user if both the amount of content posts (or shares) of the user in first time period falls below a first threshold and the amount of feedback on the posts (or shares) of the user in a second period of time falls below a second threshold. In an embodiment, the first time period and the second time period may be any suitable values, and may be different or the same. Likewise, the first threshold and the second threshold may be any suitable values, whether different or the same. For example, the threshold relating to the number of posts and the threshold relating to the number of feedback may be less than or equal to eight posts per month and two feedback on posts within the last 14 days, respectively.

The low engagement ID module 224 can also characterize users who have not logged into, or visited, the social networking system 130 for a particular time period, or who have logged in infrequently, as low activity users, another type of low engagement users. Low engagement ID module 224 may use predetermined time periods, and predetermined thresholds for logins or visits, to determine whether a user is a low engagement user. For example, if a user has not logged into the social networking system 130 within a predetermined time period of, for example, 30 days, the user may be categorized as a low engagement user. The predetermined time period also can be one day, one week, 30 days, 60 days, 90 days, or any time period desired. Also, if the frequency of a user logging in or visiting is less than a predetermined frequency, the user may be characterized as a low engagement user. For example, if the user's log-in frequency is less than, say, two logins per week, then low engagement ID module 224 may determine that the user is a low engagement user. The predetermined frequency can be any desired frequency, such as two logins per week, five logins per day, ten logins per month, 50 logins per year, or any other frequency. The low engagement ID module may also identify users as low activity users based on the number or frequency of logins or visits to the social networking system 130 through each (or combinations) of various devices or access channels, such as a mobile phone, a tablet, the web, other websites integrated or otherwise affiliated with the social networking system 130, etc.

In yet another embodiment, the low engagement ID module 224 may characterize a user with a low number of friends (a "low friend count user") as another type of low engagement user. Users with a low number of friend connections on the social networking system 130 may be less inclined to revisit the social networking system 130 because they have few other users with whom to interact. Therefore, low engagement ID module 224 may characterize users with fewer than a predetermined number of friends (i.e., connections to other users) as low engagement users. The predetermined number of friends can be any desired number, including but not limited to one friend, five friends, ten friends, 50 friends, 200 friends, etc.

The low engagement ID module 224, in an embodiment, may also characterize new users, i.e., users who recently created their account, as another type of low engagement users. In this case, low engagement ID module 224 may determine that the user is a new user based upon the age of the account. In some instances, new users may be less inclined to revisit the social networking system 130. This may be because the new user has made few connections with other users, or because the user has not yet explored the features of the social networking system 130. If the age of the user account is less than a predetermined age, then the user may be characterized as a new user. The predetermined age can be one day, one week, one month, or any desired time period.

The low engagement ID module 224 may also characterize user accounts as new users based on the age of the account and the amount of activity related to the account since the account was created. As an example, a user may be characterized as a new user if she has had no activity within two days of account creation. The amount of activity can be any desired amount, and the type of activity can be any activity associated with the user. Similarly, the age of the account can be any desired age. For example, a user can be characterized as a new user if the account was created two days ago, and there has been no login activity in that time; if the user account was created one week ago, and there has only been one login in that time; etc.

Various examples of types of low engagement user have been provided. However, other types of low engagement users may be defined according to other criteria that may be used to determine if the user's engagement is low, including, but not limited to a number of games played by the user, a number of clicks made by the user on one or more web pages of the social networking system 130, a duration of time the user has spent using the social networking system 130, a number of advertisements viewed or clicked by the user, etc. As a generalization, a user who has any type of low engagement in connection with social networking system 130 can be characterized as a low engagement user, so that the low engagement module 150 can take action to encourage increased activity on the site. Additionally, the criteria for determining whether a user is a low engagement user can be applied individually, or can be combined in any way desired. For example, in an embodiment, the low engagement ID module 224 may categorize a user as a low engagement based solely on the age of the user account. Similarly, in an embodiment, low engagement ID module 224 may combine low engagement categories, and categorize a user as a low engagement user if the user has posted content at low frequency, and has received feedback at a low frequency. Various other combinations can also be used to categorize a user as a low engagement user.

Further, while example predetermined values have been discussed as possible thresholds to identify categories of low engagement users, various types of thresholds may be used. In an embodiment, the thresholds may be absolute values, relative values, or combinations of both. A relative threshold to identify a low engagement user may be based on a quantitative comparison of a measure of the activity of the user with a measure (e.g., actual, average, mean, etc.) of the activities of a friend or friends of the user, or other groups of users of the social networking system 130. The other groups of users may include users who are in part or in whole similar to a demographic profile of the user in question. For example, a threshold to identify a user as a low engagement user may be based on a value associated with the number of "likes" provided by, or directed to, a user divided by the number of "likes" provided by, or directed to, an average user in a predetermined group of users, such as a group including friends of the user. As another example, a threshold to identify a user as a low engagement user may be based on a value associated with the number of "comments" provided by, or directed to, a user divided by the number of "comments" provided by, or directed to, an average user having the same or similar age, geographic location, educational level, ethnicity, gender, or any other demographic feature.

Once the user is identified as a low engagement user, the low engagement module 150 may provide a communication to the user to encourage increased activity on the social networking system 130. Communications provided by the social networking system 130 to the user may include various types of messages (email, text messages, etc.) about activities that have taken place within the social network of the user, or items of interest within the social network of the user. The communications may be provided to the user as email, text, RSS, or any other suitable type of communication vehicle. The communications may include data and information designed to increase engagement of the user on the social networking system 130.

The coefficient module 216 may be used in preparing the communications. The coefficient module 216 can provide coefficients as measures of relatedness between nodes in the social graph of the social networking system 130. For example, coefficients may indicate that a user is closer to her best friend than to another person befriended by the user. In some instances, coefficients may provide, or use, weights for edges between nodes in the social graph to determine relatedness. For example, a greater weight may be given for a certain online game if the user plays the online game more often than another online game, or to a particular friend of the user if that friend frequently comments on the status of the user or of another friend of the user. The coefficient module 216 may store raw features about interactions between nodes, and has trained algorithms based thereon to provide general purpose functions to provide rankings, intelligence, suggestions, and recommendations.

Since there may be multiple paths between any two nodes, the measure of relatedness may also be based how many paths connect two nodes in the social graph. For example, if a User A makes two comments on an article posted by a User B, there may be two paths between User A and the posted article—one for each comment made by User A. Using the same example, if User A and User B are friends, there may be an additional path that indirectly connects User A to the article through User B, who posted the article. In some cases, as the number of paths between two nodes increases, the measure of relatedness between those nodes may also increase.

The coefficient module 216 may be a function, service, program, library, script, or other type of compiled or interpreted executable software module. It may be called by other services and applications for custom functions using the interactions. For example, the coefficient module 216 may be used to select stories or other types of content posted from the closest friends of a user, to sort bookmarks to online games that the user most often plays, and to sort a list of friends based on whom the user may most frequently communicate using instant message or chat services. The services and applications that employ, use, or call coefficients may be part of or external to the social networking system 130, including mobile applications and non-mobile applications.

The measure of relatedness may be based on a variety of possible interactions between nodes, whether internal or external to the social networking system 130. Nodes may include users, people, pages, or any object in the social graph. The determination of relatedness may be directional or directionless, and may depend on the interaction, closeness, weight between nodes, or on other relationships between nodes and edges in the social graph. As an example, the relatedness from one user (e.g., User A) to another user (e.g., User B) may be based on various interactions between the users including, but not limited to, whether: User A commented on a photo of User B; User A liked content or a status update of User B; User A posted on the wall of User B; User A was on the same thread as User B; User A appears in the same photo as User B; a certain amount of time (e.g., days) transpires with (or without) User A engaging with User B or content of User B; User A linked to a comment of User B; User A shared content of User B with others; User A mentioned User B in a wall comment; User A viewed profile or other web page of User B; User A and User B share common friends; User A or User B have searched for each other; User A and User B read the same article, User A and User B play the same browser game, etc.

The foregoing interactions are merely examples and other interactions may be considered in the determination of coefficients between two nodes. In the foregoing example concerning the determination of User A's coefficient for User B, many of the possible interactions informing the coefficient are based on actions of User A. However, other interactions involving actions of User B may also be considered in the determination of User A's coefficient for User B. Such interactions may include, but are not limited to, whether: User B viewed a photo of User A; User B viewed an album of User A; a certain amount of time (e.g., days) transpires with (or without) User B engaging with User A or content of User A; etc. Further, the interactions that inform the determination of relatedness by the coefficient module 216 may be based on various historical time durations. The determination of relatedness may also be based on a frequency of interaction within those historical time durations. For example, determinations of relatedness may be based on how many times or how frequently interactions occurred within the last 30 days, 60 days, 90 days, etc. For example, how often User A views the profile or content associated with User B may be determined and expressed as an observation coefficient.

The various interactions can also be weighted so that some types of interactions affect the measure of relatedness between nodes more than others. For example, in one embodiment, an interaction of User A and User B directly searching for each other may be given more weight than User A and User B commenting on the same thread. In this case, because of the weighting, the coefficient module 216 may provide a greater measure of relatedness between User A and User B if they have searched for each other, than if they merely commented on the same thread. This example is provided only for illustrative purposes. Any desired weighting can be assigned to any interaction as desired, so that different interactions affect the measure of relatedness more or less so than others.

Various services may call the coefficient module 216 to use coefficients in their computations. For example, a Top Friends service may use the coefficients to determine which friends are most closely related to a user within the social graph. In other words, "top friends" may refer to a prioritized identification of connections of the user with whom she enjoys the highest measures of relatedness. The determination of top friends may be used by the social networking system 130 in a variety of contexts, such as: to identify participants to play online games; to identify relevant connections to the user for inclusion in her social network; to display a listing of photos of persons having highest relevance to the user; to otherwise display or list an identification of persons having highest relevance to the user; to identify persons with whom the user can engage in an instant message or chat session; etc. Other examples of services that may use coefficients include, but are not limited to, Top Users, Top Pages, Top Applications, Top Fans, etc. Coefficients are further discussed in U.S. patent application Ser. No. 12/978,265, filed on Dec. 23, 2010, which is hereby incorporated by reference in its entirety.

The email engine 210, through a Top Friends or similar service, may call the coefficient module 216 to identify the friends of the user with high measures of relatedness. The measures of relatedness provided by the coefficient module 216 and relevant services may allow for the identification of top friends of the user. The identification of top friends, in turn, may allow information about activities regarding such friends to be prioritized over activities relating to others. Once prioritized, the information about activities may be selected for inclusion in communications for the user provided by the email engine 210. Such information may relate to, for example, photos and stories posted by the top friends of the user.

In an embodiment of the invention, to identify the friends having the highest measures of relatedness with the user, the friends may be ranked based on their respective coefficients with the user. Then, a predetermined number of friends may be selected from the top of the ranking. Once friends with the highest measures of relatedness are identified, the activities associated with them may be prioritized over the activities of others. The email engine 210 then may create references associated with the prioritized activities and embed the references in communications. The references may be classified into different types of information and presented separately in the communication according to their types. In an embodiment, the ranking of friends may be based on relationship information between a user and another user, or content of another user, other than as provided by the coefficient module 216.

In some instances, coefficients may be used to provide a measure of relatedness between users that are not already connected as friends. This may allow the social networking system 130 to provide friend suggestions to a user. For example, a friend suggestion list service may provide a list of suggested users that the user can befriend. To create the list, the service may call coefficients to determine which other users, that are not already connected to the user, are most closely related to the user through various interactions. The friend suggestion list service can then provide a list of those users who are most closely related, so that the social networking system 130 can suggest that the user may wish to befriend them.

Like the top friends, the users who are the top friend suggestions may be ranked based on their respective coefficients with the user. A predetermined number of friend suggestions can then be selected from the top rankings. These top friend suggestions can be provided to the user in communications so that the user can make additional connections to other users of the social networking system 130.

The communication log 218 maintains information about communications provided by the social networking system 130 to the user. The communication log 218 may include transactional information such as the category and type of communications sent to the user, as well as the activities that prompt or trigger provision of the notifications. The communication log 218 also may include information regarding the date and time the communications are provided to the user. In an embodiment of the invention, the communication log 218 may be implemented as a database table.

Figure 3:
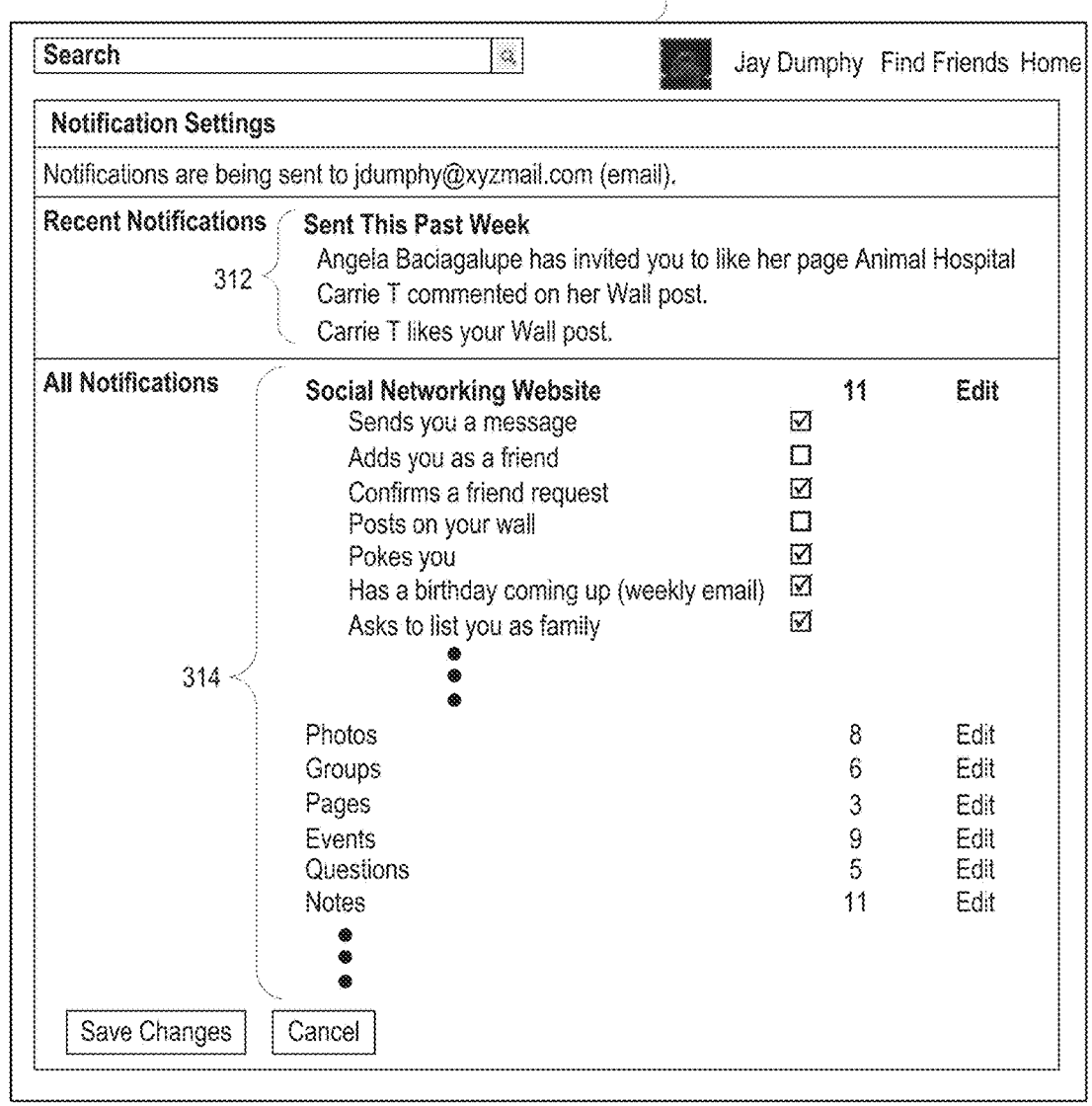
FIG. 3 shows a notification setting page with example types of notifications that may be provided by the social networking system in accordance with an embodiment of the invention.

A notification is a type of communication for which the communication log 218 maintains information. As described in more detail below, a notification may be a message that is sent to the user account immediately upon the occurrence of an event. FIG. 3 is an example of a notification setting page 310 that shows types of possible notifications that may be provided by the social networking system 130 to a user. In some cases, events may trigger the social network to send a notification to a user. For example, if another user "likes" a user's status, the social networking system 130 can immediately send a notification to the user to inform the user that the other user likes the status. Notifications can also be sent after a delay, predetermined or otherwise. The notification setting page 310 can allow the user to control what events will trigger sending a notification and what types of notifications are sent.

Recent notifications 312 list the notifications that have been provided to the user in the recent past. As shown, the recent notifications 312 may include, for example, invitations provided to a user to "like" the webpage of a friend within the social network of the user of the social networking system 130. As another example, the recent notifications 312 may include notice that a friend within the social network of the user has commented about content that has been posted to an area within the social networking system 130 dedicated to the friend. As yet another example, the recent notifications 312 may include an indication that a friend of the user "likes" content posted by the user. The recent notifications 312 may include other types of notifications as well.

Notification listing 314 enumerates example categories of notifications that may be sent to the user. Notification categories may include, for example, a social networking website, photos, groups, pages, events, questions, notes, links, video, help center, wall comments, places, deals, other updates, credits, and other applications. Each category may provide for notifications that are sent to the user when an event relating to the particular category occurs. For example, notifications concerning the social networking website category may be provided to the user when, for example, a friend of the user sends a message to the user within the social networking website, another adds the user as a friend within a social network, another confirms a request by the user to become friends, another posts to a portion of a social network website that is dedicated to the user, another "pokes" the user, another requests that the user be identified as family member (not shown), another "likes" the post of the user (not shown), birthdays of friends of the user are imminent, etc. As another example, notifications concerning the photos category may be provided to the user when, for example, the user is "tagged" in a photo, another comments on a photo in which the user appears or is "tagged", the user uploads a photo to the social networking website, etc. Like notifications concerning the social networking website category and the photos category, notifications for other categories of the notification listing 314 may also be provided to the user upon the occurrence of certain activities related to the category. In an embodiment of the invention, other categories of notifications and notifications for each category not shown in FIG. 3 may be provided by the social networking system 130, and may be entirely or partially included in the notification listing 314.

The notification setting page 314 may provide for real-time or intermittent provision of notifications upon the occurrence of the associated event. For example, when a user has chosen to receive notifications when a friend of the user "likes" a post of the user, a notification may be sent as soon as the social networking system 130 determines that the event has occurred. In an embodiment of the invention, notifications may be accumulated and sent in batches at predetermined frequencies. For example, when a user has chosen to receive notifications about upcoming birthdays of friends, notifications about one or many birthdays of friends may be sent at a specific interval, as shown in FIG. 3. In an embodiment of the invention, the timing and frequency of notifications may be determined by the user, the social networking system 130, or a combination thereof. In an embodiment of the invention, the notification settings of the user may be maintained in the user profile store 136.

In a customize mode for notifications, the notification listing 314 may allow the user to select which of the possible notifications may be provided to the user. For example, the user may choose to receive a notification when someone in the social network sends a message to the user but may choose not to receive a notification when another in the social network adds the user as a friend. As another example, the user may choose to receive a notification when another person in the social network of the user confirms the user as a friend but may choose not to receive a notification when another person posts a message on space provided by the social networking system 130 dedicated to the user. The customize mode allows the user to implement personalized notification preferences based on the importance or interest level of the notifications. In the customize mode, the notification settings may be set and changed entirely or partially by the user.

In a "minimal email" mode for notifications, all or a significant portion of the possible notifications are not provided to the user when the activities that would otherwise trigger the notifications occur. In the minimal email mode, the notification listing 314 may display a listing of notifications that are disabled (not shown in FIG. 3) and not selectable by the user. Disabling notifications prevents the user from selectively choosing which notifications to receive or not to receive, as is possible in the customize mode. The minimal email mode may be implemented to stop or prevent the user from receiving any notifications about activities concerning her social network. In an embodiment of the invention, control over notifications to be provided to the user, and selection of the customize mode or the minimal email mode, may be exercised by the user, the social networking system 130, or a combination thereof.

Although the notification listing 314 shows settings for notifications, the social networking system 130 can also provide settings pages for other types of communications as well. For example, a digest communication settings page may allow the user to control the type of information included in a digest communication, the frequency of the digest communication, etc. As will be discussed below, a digest communication may be a communication that includes a list of recent activity and/or other information that has recently occurred on the social networking site. A digest communication settings page may allow the user to include, or exclude, any type of information or activity in the digest communication.

Referring again to FIG. 2, the multifeed module 214 may provide other types of information about the social network of a user. The multifeed module 214 may manage and track information about activities of friends and other contacts of the user. For example, the multifeed module 214 may provide information about status information posted by friends. Status information may include temporary information published by a friend of the user that reflects the current thoughts and expressions of the friend. By its nature, posted status information may change frequently and the multifeed module 214 tracks such changes. As another example, the multifeed module 214 may also track information about photos and videos that are posted by friends of the user.

The multifeed module 214 may also track stories concerning friends of the user. Stories may include various actions taken by the friends in the social network. For example, a story may involve one or more friends "liking" the photo of another friend. As another example, a story may involve one or more friends "liking" the status of another friend. In addition to the information described herein, other types of information also may be tracked by the multifeed module 214.

The login log 222 maintains information regarding the history of engagement by a user with the social networking system 130. The engagement information maintained by the login log 222 may include information regarding the date and times of prior visits by the user to the social networking system 130. The engagement information may also include the date and time of the last visit by the user to the social networking system 130. In an embodiment of the invention, the login log 222 may maintain other types of engagement information, such as the history of logins to the social networking system 130 by the user or the history of certain acts or actions taken by the user.

The email engine 210 may compare information from the login log 222 with one or more predetermined time intervals to determine whether to provide a communication to the user. The communication can include a digest of activity, a list of friend suggestions, a description of activity that recently took place, or any other information. In particular, the email engine 210 may retrieve from the login log 222 the date and time of the last engagement of the user with the social networking system 130, and/or the date and time of the last email sent to the user by the email engine 210. If the time since the last engagement and/or the time since the last email is more than one or more predetermined time intervals, the email engine 210 causes the communication to be provided to the user. In an embodiment of the invention, a predetermined time interval is two days. In other embodiments of the invention, the predetermined time interval may be more or less than two days.

After the communication is provided to the user, the email engine 210 may periodically send additional communications, such as emails. For every instance when the time since the last engagement by the user with the social networking system 130 exceeds the predetermined time interval, an additional communication may be provided to the user. For example, if the predetermined time interval is two days, a user who has not visited the social networking system 130 for five days will receive two separate communications. From the time of the last visit by the user to the social networking system 130, one communication will be provided after the second day, and the other digest email will be provided after the fourth day. A user that is engaged at a low level with the social networking system 130 thus may receive a series of communications at predetermined time intervals based on an extended period of no engagement. The time period between communications may be set so as to provide timely reminders and encourage the user to log into, visit, and engage with the social networking system 130. The time period between communications may also be set so that the frequency of communications sent to the user is not too high or does not exceed a certain value.

Each communication may be provided during a period of low engagement by a user at different predetermined time intervals. For example, the communication may be continually provided at a first predetermined time interval for a first period of time. In this example, the first predetermined time interval may be every two days and the first period of time may be 14 days. After that first period of time, the communication may be continually provided at a second predetermined time interval for a second period of time. In this example, the second predetermined time interval may be every 14 days and the second period of time may be the time period after an initial 14 days. In a similar manner, additional communications may be provided at other predetermined time intervals for other periods of time. In an embodiment, the frequency of the communications can progressively decrease from period of time to period of time, so that over time, the user receives less frequent communications. In another embodiment, the frequency of the communications can progressively increase, or can vary in any other desired manner, between periods of time. The predetermined time intervals and the periods of time may vary and take any values determined by the social networking system 130 to be suitable. In an embodiment, communications may be provided during a period of low engagement by a user at variable time periods depending on user activity or other attributes associated with the user.

The email engine 210 can also impose a frequency cap for communications to the user account. For example, if there is a large amount of activity on the social networking system 130 related to the user account, the social networking system 130 may generate a large amount of communications for the user. In order to limit the number of communications received, the email engine 210 can impose a frequency cap, i.e., a maximum frequency, for communications sent to the user. In an embodiment, the frequency cap may be a predetermined frequency designed so that the user account does not receive too many communications. The frequency cap can also be a frequency setting that can be set by the user. The frequency cap can be any appropriate frequency including, but not limited to a number of communications per minute, per hour, per day, per week, per month, etc.

The frequency cap may also be a maximum number of messages sent to a user in relation to a particular piece of content. In other words, if content posted by the user elicits a large amount of feedback, the email engine 210 can stop sending communications, such as notifications, about the feedback after a maximum amount of notifications have been sent. For example, if the maximum number of notifications per content is 100, and a user has already received 100 items of feedback for a comment she posted, then email engine 210 may refrain from sending additional notifications as more feedback is received. The maximum number of notifications can be any desired number including, but not limited to, ten, 100, 500, 1000, 2000, etc.

The communication may contain information about certain activities that have occurred within the social network of the user. The communications may be designed to include content that, when considered by the user, is most likely or optimized to cause the user to engage with the social networking system 130. Thus, the communications may contain prioritized information about the social network of the user that has been determined to be important to the user.

Although the communication has been described as an email, it is not limited to email. For example, the communication can be an instant message, a text message, a web page presented to the user, or any other form of communication that can be provided by a computing system.

Figure 4A:
FIGS. 4A-4E show communications that can be sent to a user in accordance with embodiments of the invention.

FIG. 4A shows an example of a digest communication 410, i.e., a communication that includes a digest, or summary of activity, about the social network of the user in accordance with an embodiment of the invention. The digest communication 410 may be an email, text, HTML page, or any other type of communication that can be sent to a user. In an embodiment, the digest communication 410 may be provided for a user that has been categorized as, for example, a low activity user or a low feedback user. The digest communication 410 can also be sent to other types of low engagement users, as well. The digest communication 410 may encourage the user to log onto the social networking system 130 to view or participate in the activities of her social network, thereby increasing the engagement level of the user with the social networking system 130. For example, providing digest communications to these users can encourage the users to post additional content by showing them feedback they have received and a summary of activity on the social networking system 130 that they may have missed. Typically, since a digest communication often contains a summary of events that have taken place, the digest communication can be sent to the user periodically, or after a period of time has elapsed, to allow for compilation of the events into a single communication.

The digest communication 410 includes a pending notification section 412, a friend identification section 414, and a top stories section 416. The pending notification section 412 includes a count of notifications in the categories of friend requests, messages, and notifications. The friend identification section 414 indicates that top friends have posted content in the social network of the user. The friend identification section 414 includes photos of the top friends and identifies some of them by name. The top stories section 416 includes two stories regarding friends of the user. Inclusion of these sections may act to encourage the recipient to increase engagement on the social networking system 130. The design and appearance of digest communications may vary from the example in FIG. 4A. For example, in some instances, the digest communication may include a single section, or multiple sections that describe or summarize the activity on the social networking system 130.

In an embodiment, a digest communication can include a summary of activity that has taken place with respect to one particular piece of content posted to the social networking system 130. Say, for example, that a user posts an article to the social networking system 130, and that a number of other users "like" or comment on the article. In this case, a digest communication may include an aggregation of all the activity (i.e., the "likes" and comments) related to the article. In some instances, the aggregation of activity related to the particular content may be included within a section of the digest communication. In other instances, the digest communication may include only the activity related to the particular content. Such a digest can be sent to, for example, a low feedback user or other type of low engagement user to encourage the user to increase engagement with the social networking system 130.

The digest communication 410 is intended to encourage the user to engage directly with the social networking system 130. The digest communication 410 thus includes a button or link 418 that links to the social networking system 130. A button or link 420 allows the user to see a listing of all notifications. If the notifications provided to the user are currently turned off, then a link 422 allows the user to turn the notifications back on. A link 424 allows the user to unsubscribe from future provisions of digest communications. The buttons and links described herein, when selected by the user, are user selections provided to the social networking system 130. One skilled in the art will recognize that other GUI features that direct the user to the social networking system 130 can be substituted for the buttons and links.

In an embodiment of the invention, other types of information may be embedded in the communications. For example, in addition to or instead of notification counts, friend identifications, and top stories, photos posted to the social networking system 130 by top friends of the user may be included as references in the digest communications. Persons having the highest measures of relatedness of the user may be identified as top friends of the user. Then, the images posted by the top friends may be embedded in the digest communications for the user. The digest communication may include a message about the top friends in addition to the images themselves. For example, the message may be a statement identifying the images embedded in the digest communication as images posted by top friends of the user since the user last engaged with the social networking system 130. The images may located in a portion of the digest communication that is separate from the other types of information included in the digest communication.

Figure 4B:
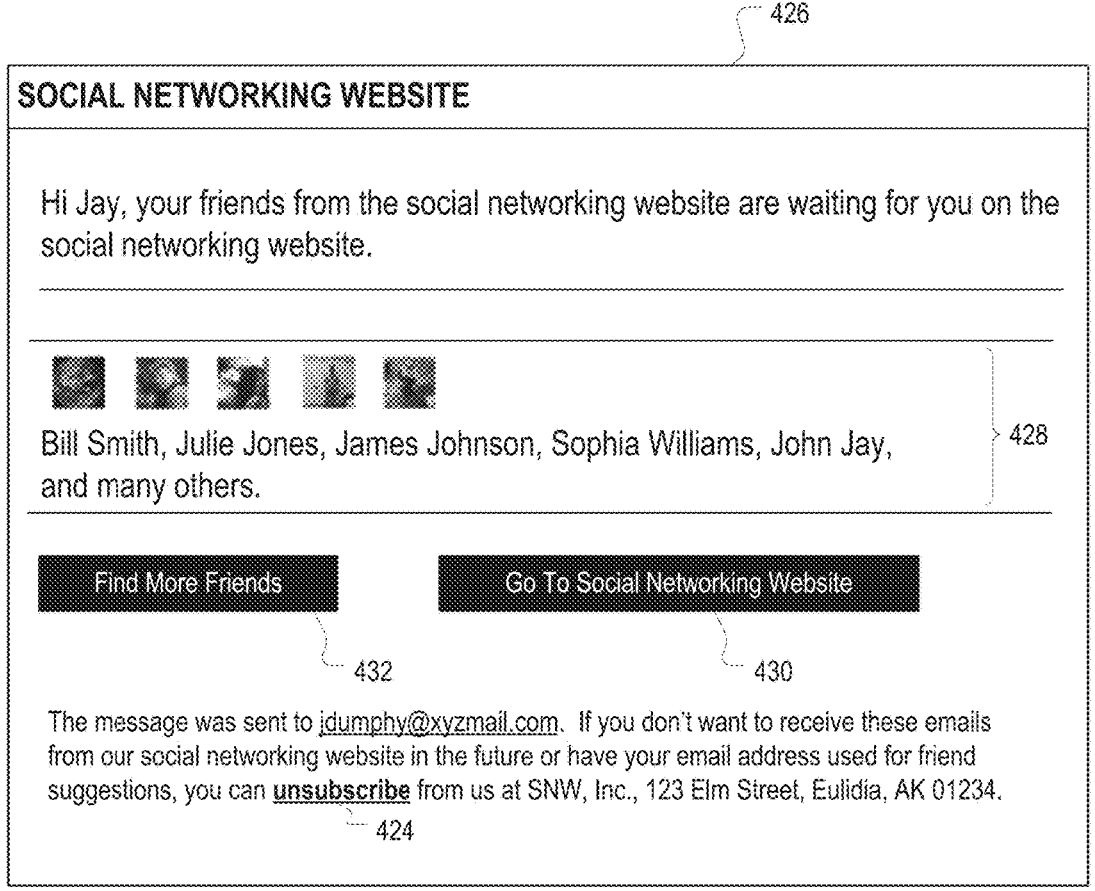

FIG. 4B illustrates an example communication 426 that includes a list of friends 428 of the user. In an embodiment, the list of friends 428 can be the top friends of the user, as determined by the coefficient module 216 described above. In another embodiment, the list of friends 428 can be friend suggestions, i.e., users who are likely candidates to become connected to the user, as determined by the coefficient module 216. In an embodiment, the communication 426 can be sent to new users, as described above, to encourage those users to view their friends' activity, connect to additional friends, and otherwise increase engagement with the social networking system 130. The communication 426 can be sent to other types of low engagement users as well.

The communication 426 can be sent once to the user after the user has had low engagement with the social networking system 130 for a period of time. The communication 426 can also be sent periodically to a low engagement user. The communication 426 can be scheduled to be sent every day, every few days, every week, or on any desired schedule.

The communication 426 can also include other features, such as buttons 430 and 432 that facilitate logging onto and using the social networking system 130. For example, the button 430, when clicked, can immediately bring the user to one or more webpages presented by the social networking system 130. The Button 432, when clicked, may bring the user directly to a page of the social networking system 130 where she can find additional friends with whom to connect.

Figure 4C:
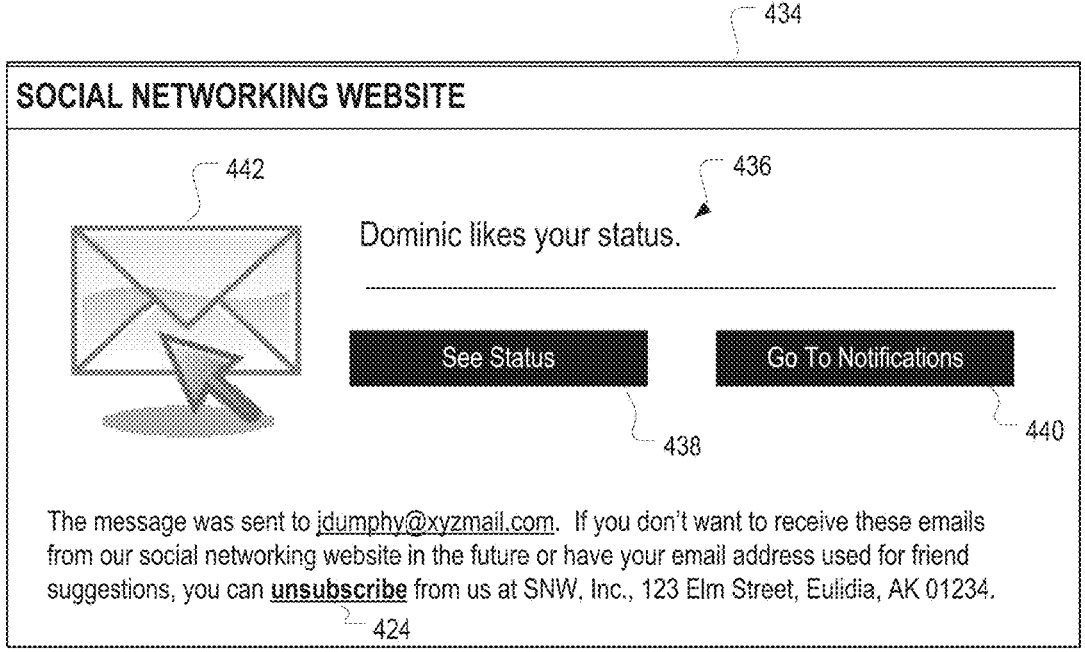
Figure 4D:
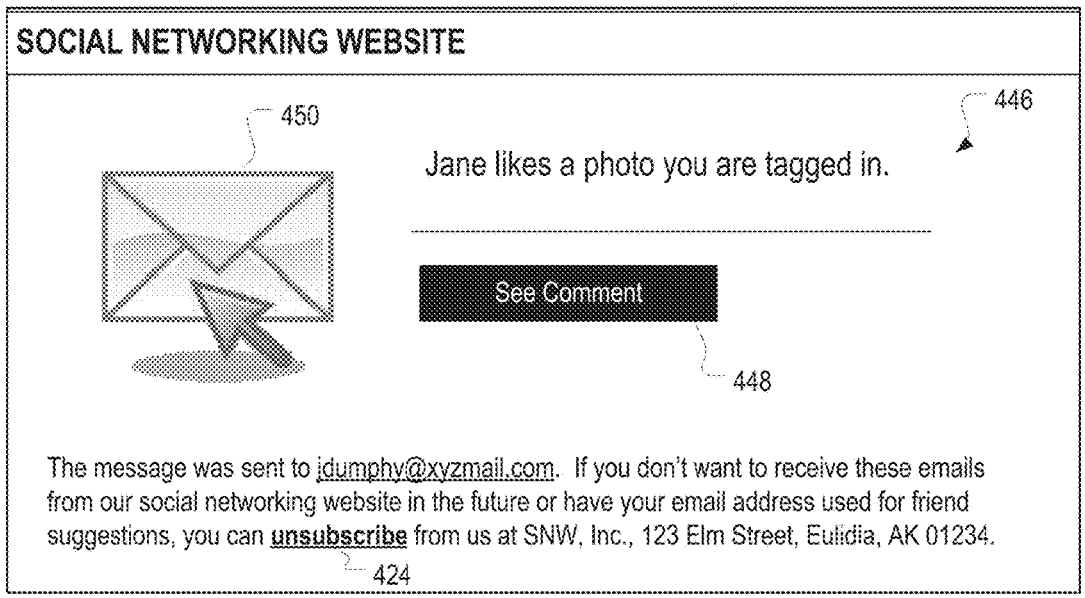
Figure 4E:
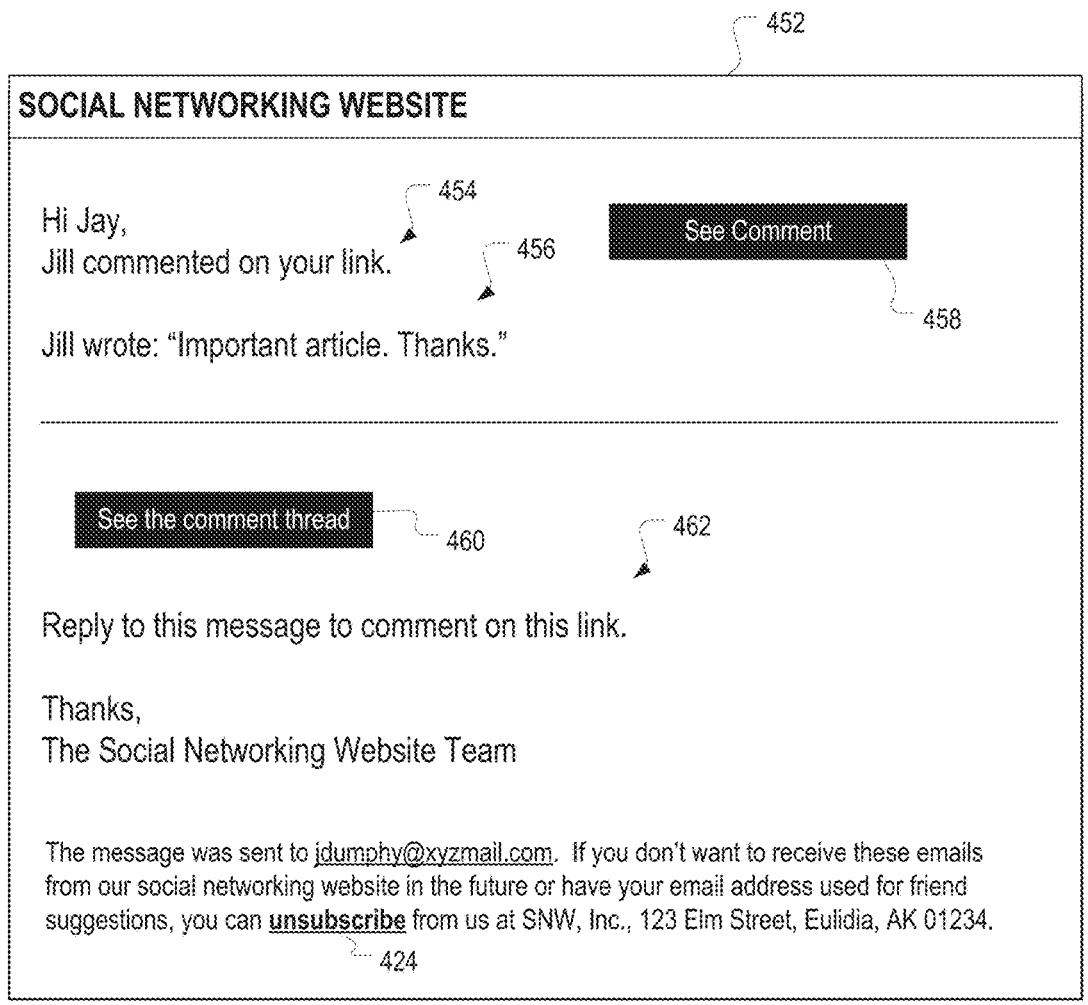

FIGS. 4C, 4D, and 4E show examples of notifications that the social networking system 130 can send to a low engagement user. Like digest communications, notifications may be sent to users to encourage them to increase their engagement with the social networking system 130. Notifications can act as an announcement or indication to a user that activity in her social network has taken place. They are typically sent to the user as soon as the activity takes place. Accordingly, a user may receive many notifications, or few notifications, depending upon the activity taking place. Moreover, notifications may not necessarily be sent according to a schedule, since user-generated activity on the social networking system 130 may not follow a schedule. Rather, the notifications can be sent to the user immediately following the occurrence of an event. Once the user receives the notification, she can engage with the social networking system 130 to view the activity.

As an example, a notification 434 in FIG. 4C can be sent to the user when another user provides feedback by "liking" the user's status posting. The notification 434 can include text 436 that informs the user of the feedback. The notification 434 can also include buttons 438 and 440, and icon 442. The button 438 and the icon 442 may link directly to a webpage where the user can view the feedback or information related to the activity or content described in the notification 434. The button 440 may link to a webpage where the user can view a list of notifications she has received.

As another example, a notification 444 in FIG. 4D can be sent to a user when another user provides feedback by commenting on content in which the user was tagged. The notification 444 can include text 446 informing the user of the feedback, as well as button 448 and icon 450, which may link directly to a webpage where the user can view the feedback or information related to the activity or content described in the notification 444.

A notification 452 in FIG. 4E can be sent to a user when another user comments on content, such as a link, posted by the user. The notification 452 can include text 454 informing the user of the feedback, as well as text 456 which displays the comment made by the other user. Button 458 may link directly to a webpage where the user can view the comment. Similarly, button 460 may link directly to a webpage where the user can view the entire comment thread. As shown by text 462, a user can reply to the notification 452 to respond to the comment from the other user. Once the user replies to the notification 452, the user's reply may be added or appended directly to the comment thread so that the user's reply becomes an additional comment to the content.

Notifications can also be triggered by information stored by social networking system 130 in the absence of user activity. For example, notifications may be triggered by a user's birthday, and sent to other users to inform them of the birthday. Other notifications based on events unrelated to user activity also may be sent to low engagement users.

Once the user receives the notifications 434, 444, or 452, or other notifications or communications, the user will know that an activity, or event has taken place, or will take place, and may log into social networking system 130 to learn more or otherwise participate in her social network as to the activity. In this way, notifications can cause the user to increase engagement with the social networking system 130.

In some embodiments, the social networking system 130 can select the type of activity to reference in communications. For example, if a user does not wish to receive a large number of emails, the social networking system 130 can send communications only to announce activity performed by the user's top friends. As another example, if the user is a new user, or has a low number of friends, the social networking system 130 can send a notification whenever any of the user's friends performs activity on the social network. Since the user may have few friends, the user may not receive too many emails. Moreover, receiving a notification whenever a friend performs an activity may encourage the user with few friend connections to log onto, or visit, the social networking system 130, and engage in activity.

Notifications sent by the social networking system 130 are not limited to the examples shown in FIGS. 4C, 4D and 4E. Notifications can be provided to the user for any type of activity on the social networking system 130 including, but not limited to receiving feedback, receiving invitations, friend requests, birthdays, new users creating an account, users logging in, changes in status, posting of content, or any other occurrence, event, or information associated with the social networking system 130.

Notifications can be sent to low engagement users in order to encourage the low engagement users to increase activity on the social networking system 130. If a user is a low feedback user, notifications can be sent to the user when the user receives feedback from her social network. For example, a notification may be provided for the user whenever another user likes content posted by the user. As another example, a notification may be sent whenever another user likes content in which the user was tagged.

If the user has a low friend count, notifications can be sent to the user, for example, every time one of the user's friends performs an action on the social networking system 130. The notifications can be sent whenever the users post content, provide feedback, or engage in other types of activity on the social networking system 130. In an embodiment of the invention, the action may not directly relate to the user. For example, the low friend count user can receive notifications if one of her friends comments on content unrelated to the user or content posted by a another user who is unrelated. If the user has few friends, then the amount of notifications provided for the user may be a modest number and thus acceptable.

As another example, if a user has a low friend count, then the social networking system 130 may send a notification to the user whenever one of the user's friends has a birthday. If the user has 10 friends, then the user will receive an acceptable number of birthday notifications because the user will only receive 10 birthday notifications per year at most.

Notifications can also be sent to a user with a low friend count, or other type of low engagement user, when the relatedness between two users, as determined by the coefficient module 216, crosses a threshold. As two users who are not connected as friends interact, the measure of relatedness between those two users may increase. For example, if the two users comment on the same content, or if the two users have an increasing number of mutual friends, then the measure of relatedness between those two users may increase. Once the measure of relatedness crosses a predetermined threshold, social networking system 130 may send a notification suggesting that the two users become friends. Assume, for example, that low friend count User A is friends with User B, and User B recently befriended User C. In this case, the measure of relatedness between low friend count User A and User C may increase, because both users are now connected to User B. If the measure of relatedness increased above a predetermined threshold, then social networking system 130 may send a notification to User A suggesting that User A befriend User C.

Figure 5:
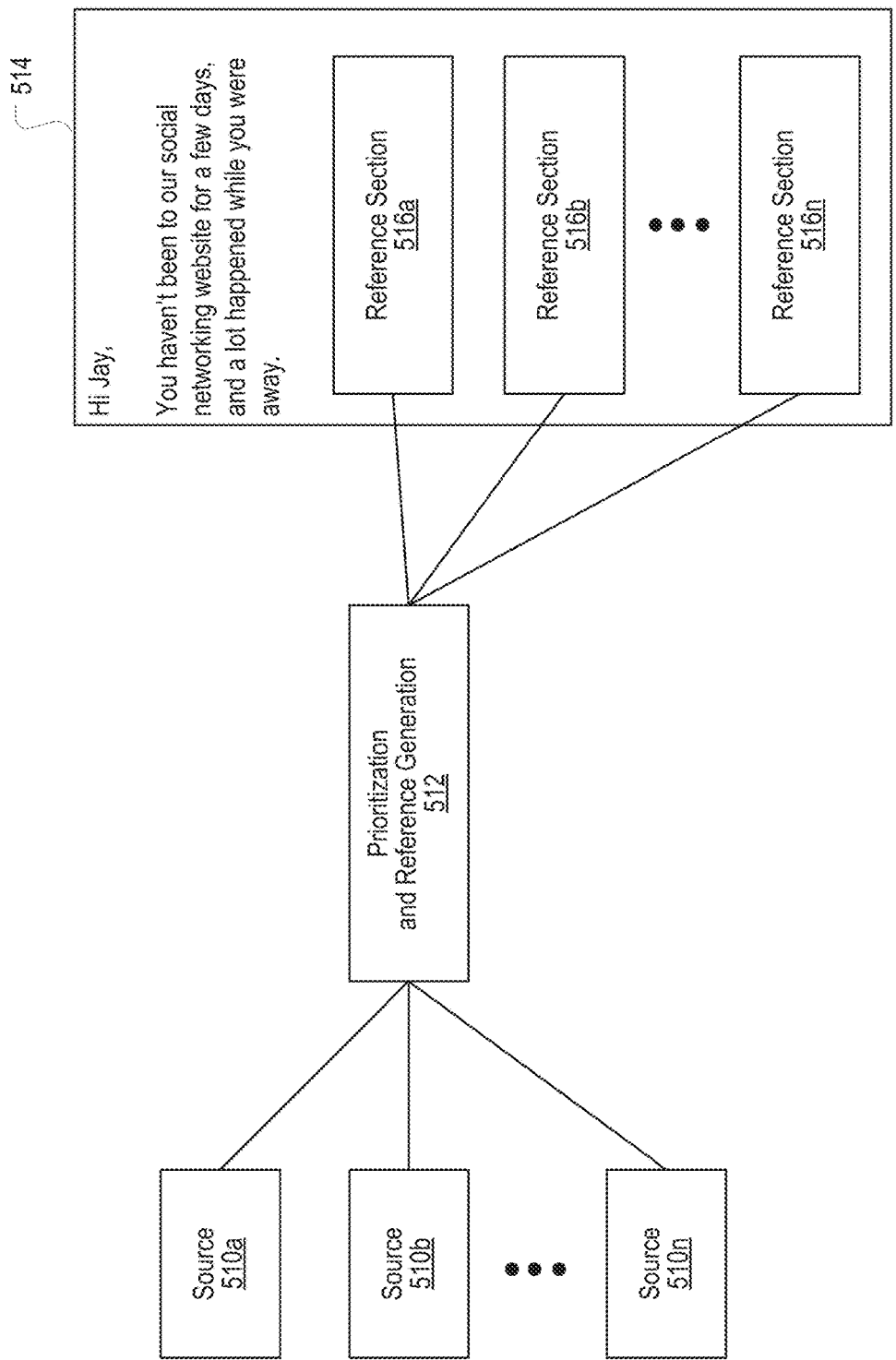
FIG. 5 illustrates creation of a digest communication in accordance with an alternative embodiment of the invention.

FIG. 5 illustrates the creation of a communication for provision to a user in accordance with an alternative embodiment of the invention. Sources 510*a-n* represent repositories of information regarding different types of activity that have occurred in the social networking system 130 and/or different user accounts within social networking system 130. The information maintained in the sources 510*a-n* may originate in the social networking system 130 or external systems 120 having information-sharing relationships with the social networking system 130. The sources 510a-n may provide large amounts of social network information having potential relevance to the user. In an embodiment, the sources 510a-n may include the multifeed module 214 and the communication log 218 of FIG. 2. The sources 510a-n also may store information apart from the information maintained or tracked by the multifeed module 214 and the communication log 218.

The information maintained in the sources 510a-n is provided to prioritization and reference generation 512. Prioritization and reference generation 512 sorts the information and prioritizes it based on relevance to the user. Prioritization and reference generation 512 may implement computational algorithms to quantitatively rank information by its relevance to the user. For example, the prioritization and reference generation 512 may implement algorithms of the coefficient module 216 and related services to determine measures of relatedness between the user and others and select activities associated with persons having the highest measures of relatedness.

Once information of threshold relevance is identified, the prioritization and reference generation 512 may create references for the most relevant information. The references then may be provided for an inclusion in a communication 514. In some instances, the communication 514 can be a digest communication, or a notification communication, as described above. The communication 514 can include reference sections 516a-n. The reference sections 516a-n may correspond to the different types of information provided by the sources 510a-n. In an embodiment of the invention, the number of reference sections 516a-n presented in the communication 514 may not be equal to the number of sources 510a-n. For example, if the communication 514 is a message communication, the communication 514 may only include one reference section 516, an announcement that the user has received feedback, for example, as shown in FIGS. 4C, 4D, and/or 4E. However, a message communication can include additional reference sections, or any number of reference sections, as well. In another example, if the communication 514 is a digest communication, communication 514 may include many reference sections 516 corresponding to different types of activity or information. Digest communication can contain only a single reference section, or any number of reference sections, if desired. In an embodiment of the invention, if the extent of references for a particular one of the reference sections 516a-n does not reach a threshold, the particular reference section may be omitted from the communication 514.

The communication 514 may include some references associated with activities that have occurred, or nodes that are present, in the social network of the user. The digest communications may not include a complete description of the activities, but rather may include only a partial description. The digest communications may omit some description about the activities to encourage the user to engage with the social networking system 130 and to access the entirety of the descriptions for the referenced activities. In an embodiment of the invention, the reference sections 516a-n may present all or part of the information about activities that has been determined by the prioritization and reference generation 512 to be most relevant to the user.

As some communications, such as a digest communication, may be periodically provided to the user, the provision of notifications by the social networking system 130 to the user may be stopped in certain circumstances. When the level of engagement of the user with the social networking system 130 within a prior predetermined interval of time is greater than or equal to a threshold value, notifications to the user are reduced or ceased to encourage the user to increase her level of engagement with the social networking system 130. In an embodiment, the threshold value may be specific to the user and based on the unique attributes of the user's activities. When the level of engagement of the user with the social networking system 130 within the prior predetermined interval of time is less than a threshold value, notifications are provided to the user to encourage the user to increase her level of engagement with the social networking system 130. In an embodiment of the invention, the threshold value may be determined by empirical data. Other techniques to determine the threshold value are possible, and other suitable threshold values are possible.

For example, the email engine 210 or the social networking system 130 may define a variable L28, which represents the number of times that a user has visited the social networking system 130 in the last 28 days. Further, the threshold value may be 15. Thus, if L28 is less than 15 for a user, then the social networking system 130 may provide notifications for the user when such provision is consistent with the policies of the social networking system 130 and the selection of the user. However, if L28 is greater than or equal to 15, then the social networking system 130 automatically may cease the provision of notifications for the user.

Similarly, the provision of notifications can also be stopped in other circumstances. For example, notifications may be sent to a new user, or a user with few friend connections, for every action taken by the user's friends. However, once the user is no longer considered a new user, or once the user gains a number of friends greater than a threshold value, the social networking system 130 may cease to send notifications for every action taken by the user's friends. Rather, in an embodiment, the social networking system 130 may send notifications only for actions taken by the user's top friends. Alternatively, once the user is no longer considered a low engagement user, the social networking system 130 can cease to send any notifications to the user. While the user is a new user or has few friends, receiving notifications for friend activity may encourage the user to increase engagement with the social networking system 130. Once the user is no longer a new user, or as the user gains more friends, reducing the amount of notifications or stopping notifications sent to the user may increase the user's engagement with the social networking system 130.

If the provision of notifications to the user is reduced or stopped, the notifications may later increase or resume. As time proceeds, the low engagement module 150 may continually monitor the predetermined prior interval of time to compare the level of engagement of the user with the social networking system 130 against the threshold value. For example, if the level of engagement of the user with the social networking system 130 is greater than the threshold value during a first interval of time, notifications for the user may be turned off. During a second interval of time subsequent to the first interval of time, the level of engagement may decrease. If the decreased level of engagement falls below the threshold value, then the low engagement module 150 may resume provision of notifications for the user. In a similar manner for later time intervals, the low engagement module 150 may cease and resume the provision of notifications based on comparison of the levels of engagement during the time intervals against a threshold value.

The level of engagement of a user with the social networking system 130 may be based on one or many factors. In an embodiment of the invention, the level of engagement may be based on the number of visits to the social networking system 130. In another embodiment, the level of engagement of a user may be based on additional or alternative factors related to participation by the user in the social networking system 130, such as the number of logins by the user, degree of interaction with other users, and the types of interaction with other users of the social networking system 130. The prior predetermined interval of time may be a predetermined number of prior days, weeks, months, years, or any other time durations.

If the social networking system 130 decides to automatically cease provision of notifications, or if the user selects to cease provision of notifications, all possible notifications may cease. In an embodiment of the invention, despite a decision to stop notifications, the provision of some notifications nonetheless may be deemed mandatory based on their deemed importance to the guidelines of the social networking system 130 or other considerations. Such notifications may continue to be provided for the user upon occurrence of related activities. For example, if a user is identified in photo posted by another (i.e., tagged), a notification may be sent to the user even if the social networking system 130 or the user has otherwise decided to stop notifications for the user. As another example, if the location of a user is posted by another, a corresponding notification may be sent to the user even if other notifications have ceased. Other types of notifications also may not be turned off. When notifications are turned off by the social networking system 130, the user may be so informed. FIGS. 6A-6B show messages provided by the social networking system 130 for the user regarding the management of notifications. FIG. 6A shows an example message 610 to inform a user that the provision of notifications to her has ceased. The message 610 includes a link 612 to allow the user to choose to turn back on notifications, such as email. When the link 612 is selected, an opt out page may be presented to the user. FIG. 6B shows an example opt out page 620. The opt out page requests confirmation from the user that notifications should resume. The opt out page 620 includes a button 622 to allow the user to confirm resumption of notifications and a button 624 to cancel resumption of notifications.

Figure 7:
FIG. 7 shows a notification setting page to allow resumption of notifications in accordance with an embodiment of the invention.

FIG. 7 shows a notification setting page allowing the user to resume the provision of notifications. A notification setting page 710 is similar to the notification setting page 310 (shown in FIG. 3) and includes recent notifications 712 and notification listing 714. The notification setting page 710 additionally includes a notification handling section 720. The notification handling section 720 allows the user to toggle between the provision of notifications and the cessation of notifications. The toggling may be performed by appropriate selection of a check box 722. As shown, the check box 722 is checked to indicate that all notifications to the user should cease. Accordingly, there are no notifications as recent notifications 712 and the notification listing 714 is disabled. To resume notifications, the check box 722 may be left unchecked.

Figure 8A:
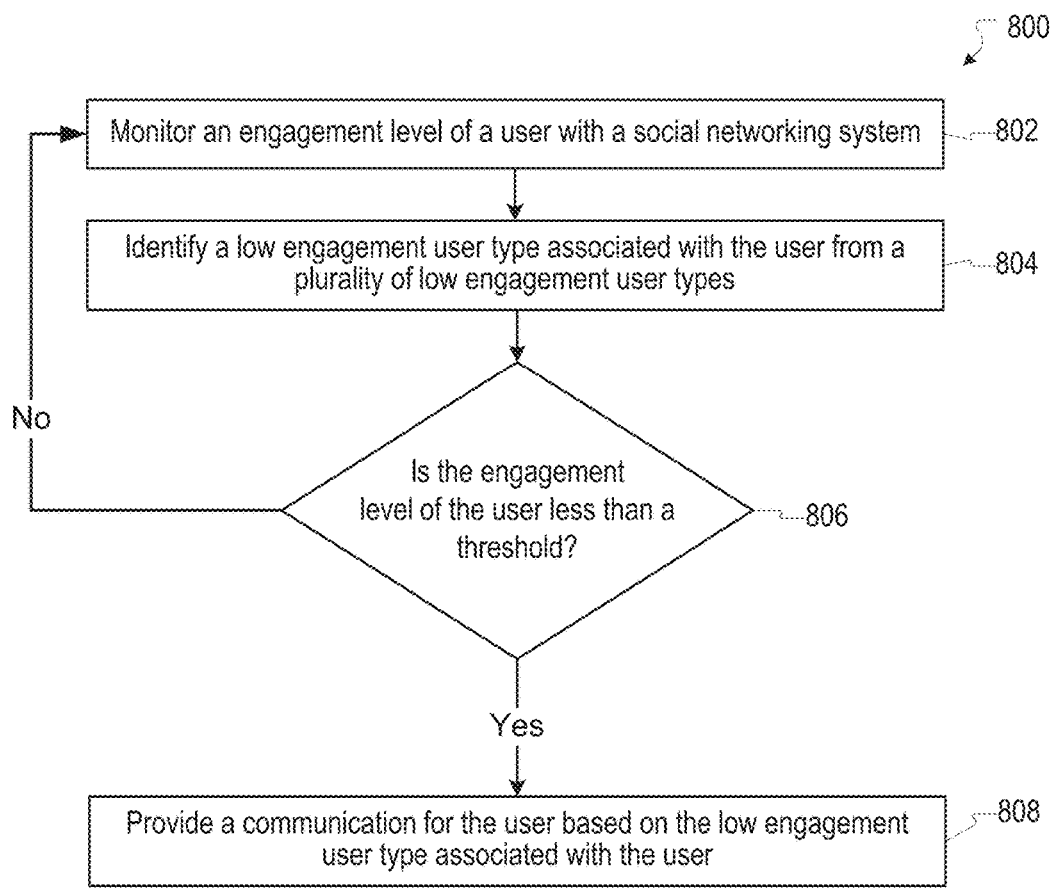
FIGS. 8A-8C show processes for managing communications in accordance with embodiments of the invention.

FIG. 8A shows an example process 800 for managing communications in accordance with an embodiment of the invention. In block 802, an engagement level of a user with a social network is monitored. In block 804, a low engagement user type associated with the user is identified from a plurality of low engagement user types. In block 806, it is determined whether the engagement level of the user is less than a threshold. If the answer for block 806 is "Yes," a communication is provided for the user based on the low engagement user type associated with the user in block 808. If the answer for block 806 is "No," the process 800 may proceed to block 802.

Figure 8B:
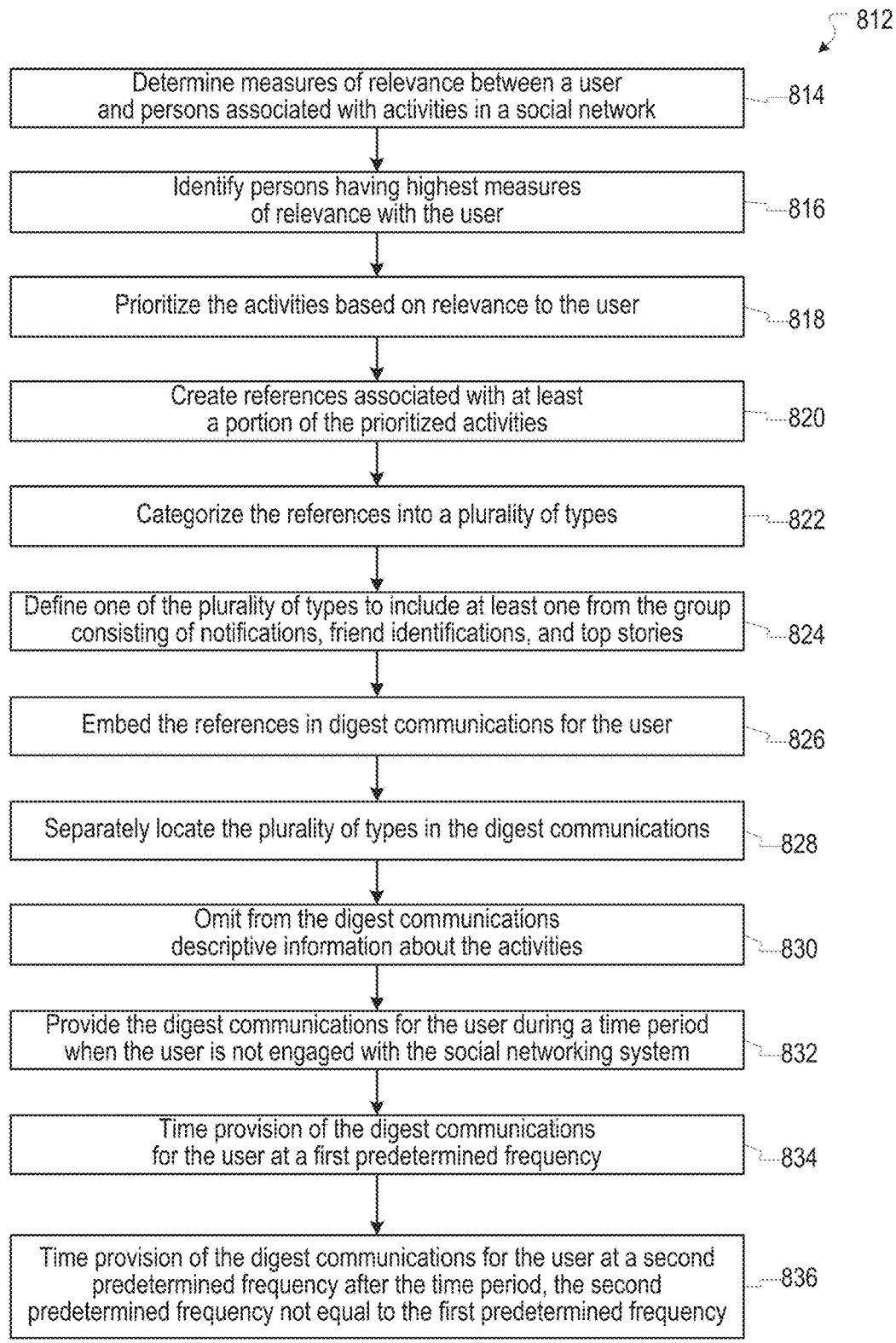

FIG. 8B shows an example process 812 for managing digest communications in accordance with an embodiment of the invention. In block 814, measures of relatedness between a user and persons associated with activities in a social network are determined. In block 816, persons having highest measures of relatedness with the user are identified. In block 818, the activities are prioritized based on relatedness to the user. In block 820, references associated with at least a portion of the prioritized activities are created. In block 822, the references are categorized into a plurality of types. In block 824, one of the plurality of types is defined to include at least one from the group consisting of notifications, friend identifications, and top stories. In block 826, the references are embedded in digest communications for the user. In block 828, the plurality of types are separately located in the digest communications. In block 830, descriptive information about the activities are omitted from the digest communications. In block 832, the digest communications for the user are provided during a time period when the user is not engaged with the social networking system. In block 834, provision of the digest communications for the user is timed at a first predetermined frequency. In block 836, provision of the digest communications for the user is timed at a second predetermined frequency after the time period, the second predetermined frequency not equal to the first predetermined frequency.

Figure 8C:
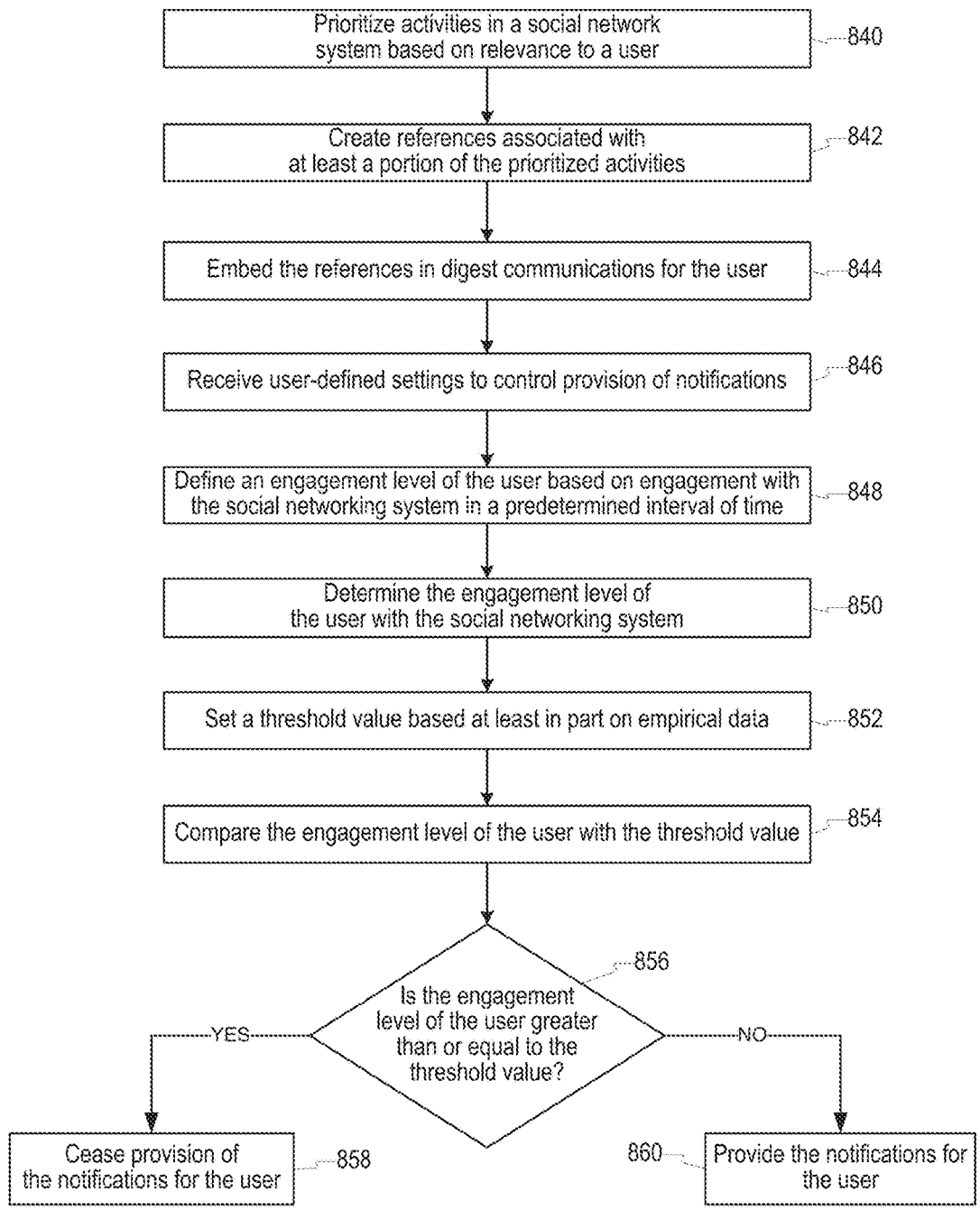

FIG. 8C is an example of a process 838 for managing notifications in accordance with an embodiment of the invention. In block 840, activities in a social network system are prioritized based on relatedness to a user. In block 842, references associated with at least a portion of the prioritized activities are created. In block 844, the references are embedded in digest communications for the user. In block 846, user-defined settings to control provision of notifications are received. In block 848, an engagement level of the user is defined based on engagement with the social networking system in a predetermined interval of time. In block 850, the engagement level of the user with the social networking system is determined. In block 852, a threshold value is set based at least in part on empirical data. In block 854, the engagement level of the user is compared with the threshold value. In block 856, it is determined whether the engagement level of the user is greater than or equal to the threshold value. If the answer is "Yes" for block 856, provision of the notifications for the user is ceased in block 858. If the answer is "No" for block 856, the notifications are provided for the user in block 860. In an embodiment of the invention, the process 838 may proceed to block 840 after the block 858 and the block 860.

In an embodiment of the invention, the process 800, the process 834, and the process 900, may be entirely or partially performed by the low engagement module 150. In an embodiment of the invention, the process 800 and the process 900 may be performed at least in part by the social networking system 130.

CONCLUSION

Figure 9:
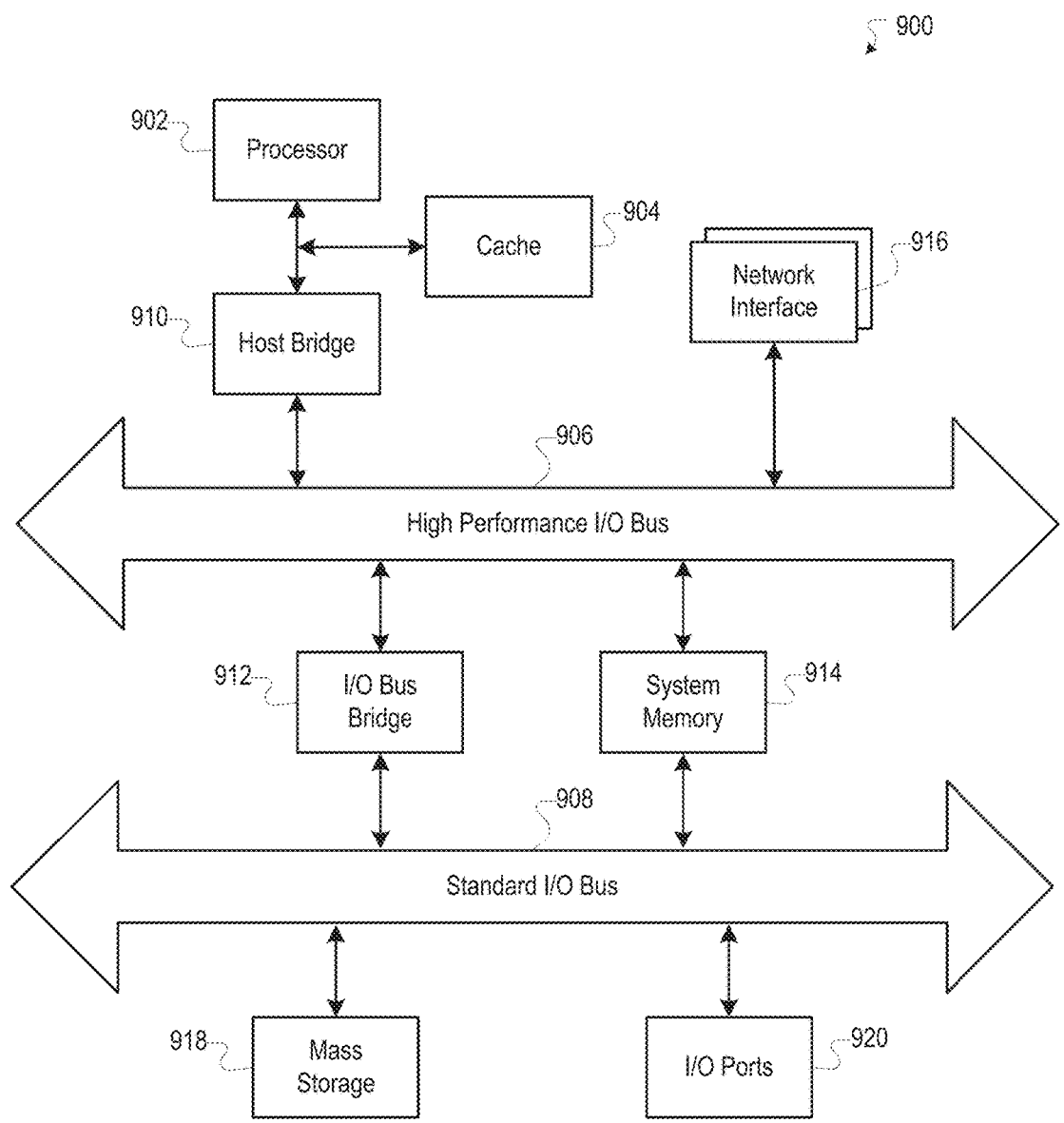
FIG. 9 shows a diagram of a computer system in accordance with an embodiment of the invention.

The foregoing processes and features can be implemented by a wide variety of machine and computer system architectures and in a wide variety of network and computing environments. FIG. 9 illustrates an example of a computer system 900 that may be used to implement one or more of the computing devices identified above. The computer system 900 includes sets of instructions for causing the computer system 900 to perform the processes and features discussed herein. The computer system 900 may be connected (e.g., networked) to other machines. In a networked deployment, the computer system 900 may operate in the capacity of a server machine or a client machine in a client-server network environment, or as a peer machine in a peer-to-peer (or distributed) network environment. In an embodiment of the invention, the computer system 900 may be the social networking system 130, the user device 110, and the external system 120, or a component thereof. In an embodiment of the invention, the computer system 900 may be one server among many that constitutes all or part of the social networking system 130.

The computer system 900 includes a processor 902, a cache memory 904, and one or more executable modules and drivers, stored on a computer-readable medium, directed to the processes and features described herein. Additionally, the computer system 900 includes a high performance input/output (I/O) bus 906 and a standard I/O bus 908. A host bridge 910 couples processor 902 to high performance I/O bus 906, whereas I/O bus bridge 912 couples the two buses 906 and 908 to each other. A system memory 914 and one or more network interfaces 916 couple to bus 906. The computer system 900 may further include video memory and a display device coupled to the video memory (not shown). Mass storage 918 and I/O ports 920 couple to the bus 908. The computer system 900 may optionally include a keyboard and pointing device, a display device, or other input/output devices (not shown) coupled to the bus 908. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 900, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 900 are described in greater detail below. In particular, the network interface 916 provides communication between the computer system 900 and any of a wide range of networks, such as an Ethernet (e.g., IEEE 802.3) network, a backplane, etc. The mass storage 918 provides permanent storage for the data and programming instructions to perform the above-described processes and features implemented by the respective computing systems identified above, whereas the system memory 914 (e.g., DRAM) provides temporary storage for the data and programming instructions when executed by the processor 902. The I/O ports 920 may be one or more serial and/or parallel communication ports that provide communication between additional peripheral devices, which may be coupled to the computer system 900.

The computer system 900 may include a variety of system architectures, and various components of the computer system 900 may be rearranged. For example, the cache 904 may be on-chip with processor 902. Alternatively, the cache 904 and the processor 902 may be packed together as a "processor module", with processor 902 being referred to as the "processor core". Furthermore, certain embodiments of the invention may neither require nor include all of the above components. For example, peripheral devices coupled to the standard I/O bus 908 may couple to the high performance I/O bus 906. In addition, in some embodiments, only a single bus may exist, with the components of the computer system 900 being coupled to the single bus. Furthermore, the computer system 900 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 900 that, when read and executed by one or more processors, cause the computer system 900 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 900, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 902. Initially, the series of instructions may be stored on a storage device, such as the mass storage 918. However, the series of instructions can be stored on any suitable computer readable storage medium. Furthermore, the series of instructions need not be stored locally, and could be received from a remote storage device, such as a server on a network, via the network interface 916. The instructions are copied from the storage device, such as the mass storage 918, into the system memory 914 and then accessed and executed by processor 902.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 900 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "another embodiment", or the like means that a particular feature, design, structure, or characteristic described in connection with the embodiment is included in at least one embodiment of the disclosure. The appearances of, for example, the phrase "in one embodiment", "in an embodiment", or "in another embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments but also variously omitted in other embodiments. Similarly, various features are described that may be preferences or requirements for some embodiments but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
monitoring an engagement level of a social networking system user, the engagement level of the social networking system user based on a measure of interaction of the social networking system user in the social networking system;
determining, by a processor, whether a user account on the social networking system associated with the social networking system user is a low activity account based at least in part on the engagement level of the social networking system user; and
based at least in part on a determination that the user account is a low activity account:
identifying a category of low activity account type associated with the user account determined to be the low activity account from a plurality of categories of low activity account types for which the engagement level of the social networking system user is below an activity threshold corresponding to the category of low activity account type, the category of low activity account type based on the engagement level of the user, each category of the plurality of categories of low activity account types defined based on a different activity threshold and one or more types of interactions with the social networking system by a social networking system user;
selecting, by the social networking system, one or more additional social networking system users having at least a threshold measure of relatedness to the social networking system user,
selecting, by the social networking system, one or more stories describing types of interactions with the social networking system corresponding to the one or more types of interactions defining the identified category of low account type associated with the user account determined to be the low activity account and performed by the selected one or more additional social networking system users,
generating, at the social networking system, a communication including the stories selected by the social networking system describing types of interactions with the social networking system corresponding to the one or more types of interactions defining the identified category of low account type associated with the user account determined to be the low activity account, and
sending the generated communication from the social networking system to the social networking system user associated with the user account determined to be the low activity account using a communication channel external to the social networking system without input from any of the additional social networking system users.

2. The method of claim 1, wherein the engagement level of the social networking system user is based on a predetermined time between logins of the social networking system user.

3. The method of claim 1, wherein the engagement level of the social networking system user is based on a predetermined amount of content shared by the social networking system user over a time period.

4. The method of claim 1, wherein the engagement level of the social networking system user is based on a predetermined amount of feedback received by the social networking system user in response to content shared by the social networking system user over a first time period.

5. The method of claim 4, wherein the engagement level of the social networking system user is further based on a predetermined amount of content shared by the social networking system user over a second time period.

6. The method of claim 5, wherein the first time period is not equal to the second time period.

7. The method of claim 1, wherein the engagement level of the social networking system user is based on a predetermined number of friends of the social networking system user.

8. The method of claim 1, wherein the engagement level of the social networking system user is based on a predetermined time after an account of the social networking system user is created.

9. The method of claim 1, wherein the communication includes a digest of activities performed by friends of the social networking system user.

10. The method of claim 1, wherein the communication includes a notification about occurrence of an event.

11. The method of claim 1, wherein the communication indicates that another social networking system user likes content shared by the social networking system user.

12. The method of claim 1, wherein the communication indicates that another social networking system user likes content in which the social networking system user has been tagged.

13. The method of claim 1, wherein the communication includes an identification of potential friends for the social networking system user.

14. The method of claim 1, further comprising continuously determining whether a user account on the social networking system associated the social networking system user is a low activity account based at least in part on the engagement level of the social networking system user.

15. The method of claim 1, further comprising sending communications to the social networking system user while the user account on the social networking system associated with the social networking system user is determined to be a low activity account.

16. A non-transitory computer-storage medium storing computer-executable instructions that, when executed by a processor, cause the processor to:
monitor an engagement level of a social networking system user, the engagement level of the social networking system user based on a measure of interaction of the social networking system user in the social networking system;
determine, by a processor, whether a user account on the social networking system associated with the social networking system user is a low activity account based at least in part on the engagement level of the social networking system user; and
based at least in part on a determination that the user account is a low activity account:
identify a category of low activity account type associated with the user account determined to be the low activity account from a plurality of categories of low activity account types for which the engagement level of the social networking system user is below an activity threshold corresponding to the category of low activity account type, the category of low activity account type based on the engagement level of the user, each category of the plurality of categories of low activity account types defined based on a different activity threshold and one or more types of interactions with the social networking system by a social networking system user,
select, by the social networking system, one or more additional social networking system users having at least a threshold measure of relatedness to the social networking system user,
select, by the social networking system, one or more stories describing types of interactions with the social networking system corresponding to the one or more types of interactions defining the identified category of low account type associated with the user account determined to be the low activity account and performed by the selected one or more additional social networking system users,
generate, at the social networking system, a communication including the stories selected by the social networking system describing types of interactions with the social networking system corresponding to the one or more types of interactions defining the identified category of low account type associated with the user account determined to be the low activity account, and
send the generated communication from the social networking system to the social networking system user associated with the user account determined to be the low activity account using a communication channel external to the social networking system without input from any of the additional social networking system users.

17. A system comprising:
at least one processor; and
a memory storing instructions configured to instruct the at least one processor to:
monitor an engagement level of a social networking system user, the engagement level of the social networking system user based on a measure of interaction of the social networking system user in the social networking system;
determine whether a user account on the social networking system associated with the social networking system user is a low activity account based at least in part on the engagement level of the social networking system user; and
based at least in part on a determination that the user account is a low activity account:
identify a category of low activity account type associated with the user account determined to be the low activity account from a plurality of categories of low activity account types for which the engagement level of the social networking system user is below an activity threshold corresponding to the category of low activity account type, the category of low activity account type based on the engagement level of the user, each category of the plurality of categories of low activity account types defined based on a different activity threshold and one or more types of interactions with the social networking system by a social networking system user,
select, by the social networking system, one or more additional social networking system users having at least a threshold measure of relatedness to the social networking system user,
select, by the social networking system, one or more stories describing types of interactions with the social networking system corresponding to the one or more types of interactions defining the identified category of low account type associated with the user account determined to be the low activity account and performed by the selected one or more additional social networking system users
generate, at the social networking system, a communication including the stories selected by the social networking system describing types of interactions with the social networking system corresponding to the one or more types of interactions defining the identified category of low account type associated with the user account determined to be the low activity account, and
send the generated communication from the social networking system to the social networking system user associated with the user account determined to be the low activity account using a communication channel external to the social networking system without input from any of the additional social networking system users.

* * * * *

UNITED STATES PATENT AND TRADEMARK OFFICE
CERTIFICATE OF CORRECTION

PATENT NO. : 10,158,731 B2
APPLICATION NO. : 14/529062
DATED : December 18, 2018
INVENTOR(S) : David Y. Chen et al.

Page 1 of 1

It is certified that error appears in the above-identified patent and that said Letters Patent is hereby corrected as shown below:

In the Claims

Column 31, Lines 37-38, Claim 1, delete "the social networking system" and insert -- a social networking system --.

Column 31, Line 67, Claim 1, delete "low account type" and insert -- low activity account type --.

Column 32, Line 9, Claim 1, delete "low account type" and insert -- low activity account type --.

Column 32, Line 63, Claim 14, delete "system associated the social networking system user" and insert -- system associated with the social networking system user --.

Column 33, Lines 10-11, Claim 16, delete "the social networking system" and insert -- a social networking system --.

Column 33, Line 40, Claim 16, delete "low account type" and insert -- low activity account type --.

Column 33, Line 49, Claim 16, delete "low account type" and insert -- low activity account type --.

Column 34, Line 9, Claim 17, delete "the social networking system" and insert -- a social networking system --.

Column 34, Line 39, Claim 17, delete "low account type" and insert -- low activity account type --.

Column 34, Line 42, Claim 17, delete "social networking system users" and insert -- social networking system users; --.

Column 34, Lines 48-49, Claim 17, delete "low account type" and insert -- low activity account type --.

Signed and Sealed this
Ninth Day of July, 2019

Andrei Iancu
*Director of the United States Patent and Trademark Office*